United States Patent
Boenau et al.

(10) Patent No.: US 9,753,897 B2
(45) Date of Patent: *Sep. 5, 2017

(54) ELECTRONIC BOOK BUILDING SYSTEM AND METHOD

(71) Applicant: LSC Communications US, LLC, Chicago, IL (US)

(72) Inventors: Robert Boenau, Cedar Park, TX (US); Robert Todd Warren, Pflugerville, TX (US); Anna Garcia, Austin, TX (US); Jose Patino, Pflugerville, TX (US)

(73) Assignee: LSC COMMUNICATIONS US, LLC, Chicago, IL (US)

( * ) Notice: Subject to any disclaimer, the term of this patent is extended or adjusted under 35 U.S.C. 154(b) by 6 days.

This patent is subject to a terminal disclaimer.

(21) Appl. No.: 14/704,604

(22) Filed: May 5, 2015

(65) Prior Publication Data

US 2015/0234792 A1  Aug. 20, 2015

Related U.S. Application Data

(63) Continuation of application No. 13/302,660, filed on Nov. 22, 2011, now Pat. No. 9,053,190.

(60) Provisional application No. 61/416,190, filed on Nov. 22, 2010.

(51) Int. Cl.
*G06F 3/00* (2006.01)
*G06F 17/21* (2006.01)
*G06F 17/24* (2006.01)

(52) U.S. Cl.
CPC ............ *G06F 17/212* (2013.01); *G06F 17/24* (2013.01)

(58) Field of Classification Search
CPC .................. G06F 17/212; G06F 17/24
See application file for complete search history.

(56) References Cited

U.S. PATENT DOCUMENTS

| | | | |
|---|---|---|---|
| 7,346,844 B1 * | 3/2008 | Baer | G06Q 30/0603 434/362 |
| 9,053,190 B1 | 6/2015 | Boenau et al. | |
| 2003/0144961 A1 * | 7/2003 | Tharaken | G06Q 30/02 705/57 |
| 2004/0205632 A1 | 10/2004 | Li | |
| 2007/0298399 A1 | 12/2007 | Shao et al. | |

(Continued)

OTHER PUBLICATIONS

Notice of Allowance for U.S. Appl. No. 13/302,660 dated Feb. 4, 2015, 11 pages.

(Continued)

*Primary Examiner* — Kyle Stork
(74) *Attorney, Agent, or Firm* — Sprinkle IP Law Group

(57) ABSTRACT

A method, system and computer program product for building a custom publication is provided. A user may access a library of electronic source publications having defined units of content within the source publications, the library storing source publication metadata for the defined units of content. The user may select units of content from source publications for inclusion in an unpublished custom publication. The unpublished custom publication may be published in an electronic or printed format, wherein publishing the unpublished custom publication comprises applying consistent styling to common structural elements in the set of custom publication units of content to create a published custom publication with consistent styling.

21 Claims, 29 Drawing Sheets

(56) References Cited

U.S. PATENT DOCUMENTS

2008/0189600 A1    8/2008   Lau et al.
2008/0222552 A1    9/2008   Batarseh et al.

OTHER PUBLICATIONS

Office Action for U.S. Appl. No. 13/302,660 dated Apr. 21, 2014, 10 pages.
Office Action for U.S. Appl. No. 13/302,660 dated Sep. 4, 2014, 10 pages.

* cited by examiner

Tag Line - Lorem ipsum dolor sit amet, consectetuer adipiscing elit, sed diam...  Welcome John Doe!  Sign Out — 229

| Home | My Custom Books | My Favorites | My Profile | FAQ | Help |

— 225

Lorem ipsum dolor sit amet, consectetuer, sed adipiscig elit, sed quia diam sed ipsum sit amet. — 235

Search For Publications — 230

Browse Publications

☐ American Government
  — Congress
  — Elections
  — Interest Groups
  — Media & Public Opinion
  — Political Parties
  — Presidency ☐ Public Policy
  — Environmental Policy ☐ CQR Issues
  — All CQR Issues
  — Global Issues
  — Issues in American Public Policy
  — Issues in Race & Ethnicity
  — Urban Issues Search For
[Enter search keywords...]
<<Basic Search Title
[Enter all, or part, of a title you are interested in...]

Author/Editor
[Enter all, or part, of an author you are interested in...]

ISBN
[Enter the known ISBN number...]

Chapter Title
[Enter all, or part, of a chapter title you are interested in...]

Chapter Author
[Enter all, or part, of a chapter author you are interested in...]

Courses
[Courses ▼]

[Search] — 227

Tag Line - Lorem ipsum dolor sit amet, consectetuer adipiscing elit, sed diam...   Welcome John Doe!   Sign Out

| Home | My Custom Books | My Favorites | My Profile | FAQ | Help | Enter search keywords... | Find Publication >> |

Share Custom Book

Lorem ipsum quia dolor sit amet, consectetur, adipisci velit, sed quia non numquam eius modi tempora incidunt ut labore et dolore magnam aliquam quaerat voluptatem. Ut enim ad minima veniam, Notification Email ~440

Greetings,

Steve Smith would like to share the following CQ Press custom book with you:

Title: Custom Book XYZ
Instructor: Steve Smith, PhD
Institution: Harvard
Course: Canadian History 101, Fall 2008
Cost: $99.99
Page Count: 150
Description: Lorem ipsum dolor sit amet, consectetuer sed adipiscing elit sed diam sed eti Lorem ipsum sit.

Instructor Message: <<Instructor Message>>

<<URL>>

If you do not yet have a CQ Press BookBuild account, you can sign-up for one here.

Regards,

The CQP Press BookBuild team.

420

Share with: * ~425
● Students
○ Instructors

Email Addresses * ~430

Instructor Message ~435

445~ [Share Book]  [Cancel]

415

* denotes required fields

Custom Book Viewer: Custom Book Title

Contents

| Front Cover | | My Bookmarks ▼ | Remove Bookmark from Current Chapter | Add Note | Custom Book Summary>> |
| --- | --- | --- | --- | --- | --- |
| Title Page | | | | Bookmark | Print Chapter>> Highlight |

Copyright

Table of Contents

Header: Lorem dolor sit amet

Author 1, Author 2, Full Course Book Title, Publisher Name & Date, Page #-#, ©[copyright 1. Chapter Title, Author Name in Book Name 2. Chapter Title, Author Name in Book Name

Print Chapter

Print a physical copy of this chapter. ⟋ 530

Note: You can only print a chapter once!

3. Chapter Title, Author Name in Book Name

Trim Size: 8.5"x11" ⟋ 525      520

4. Chapter Title, Author Name in Book Name

⦿ Print chapter with notes included

⦿ Only my notes
○ Everyone's notes ⎱ 535

5. Chapter Title, Author Name in Book Name

○ Print chapter without notes ⟋ 545

[ Print ] [ Cancel ]

Text reference from commentary by BBC on 11/1/08, http://bbc.co.uk/stuff/

6. Chapter Title, Author Name in Book Name accusantium doloremque laudantium, totam rem aperiam, eaque ipsa quae sit aspernatur aut odit autab illo ut inventore veritatis et natus quasi architecto beatae vitae dicta sunt explicabo. Nemo enim ipsam voluptatem, et magni s... t odit aut fugit, sed quia consequuntur magni quia dolores eo... sciunt sit amet sit amet Sed perspiciatis unde labore omnis ... ut perspiciatis non omnis iste, natus Neque porro quisquam ... r sit amet, veritatis consectetur, adipisci velit, sed quia sit non numquam eius modi, tempora incidunt ut, odit et dolore magnam.

Footer: Lorem dolor sit amet

Preview Custom Book: Publication Title

Contents

Front Cover  730

Title Page

Copyright

Table of Contents

1. Chapter Title, Author Name in Book Name
2. Chapter Title, Author Name in Book Name
3. Chapter Title, Author Name in Book Name
4. Chapter Title, Author Name in Book Name
5. Chapter Title, Author Name in Book Name
6. Chapter Title, Author Name in Book Name

---

Lorem Ipsum dolor sit amet, consectetuer sed adipicing elit sed diam sed ipsum sit amet sit amet, consectetuer sed adipicing elit sed diam. Lorem dolor sit amet, consectetuer sed Page 55

Footer: Lorem dolor sit amet

---

Header: Lorem dolor sit amet

Lorem Ipsum dolor sit amet, consectetuer sed adipicing elit sed diam sed ipsum sit amet sit amet, consectetuer sed adipicing elit sed diam. Lorem dolor sit amet, consectetuer sed adipicing elit sed.

Lorem Ipsum Sit Amet

Lorem ipsum dolor sit amet, consectetuer sed adipicing elit sed diam sed ipsum sit amet sit amet, Sed ut perspiciatis unde omnis iste natus error ut odit perspiciatis voluptas voluptatem accusantium doloremque laudantium, totam rem aperiam, eaque ipsa quae sit aspernatur aut odit autab illo ut inventore veritatis et natus quasi architecto beatae vitae dicta sunt explicabo. Nemo enim ipsam voluptatem, et magni sit quia voluptas sit aspernatur aut odit aut fugit, sed quia consequuntur magni quia dolores eos qui ratione voluptatem sequi nesciunt sit amet, Sed ut perspiciatis non omnis iste, natus Neque porro quisquam est, qui dolorem ipsum quia dolor sit amet, veritatis consectetur, adipisci velit, sed quia sit non numquam eius modi, tempora incidunt ut, odit et dolore magnam.Lorem ipsum dolor sit amet, consectetuer sed adipicing elit sed diam sed ipsum sit amet sit amet, Sed ut perspiciatis unde omnis iste natus error ut odit perspiciatis sunt explicabo.

Nemo enim ipsam voluptatem, et magni sit quia voluptas sit aspernatur aut odit aut fugit, sed quia consequuntur magni quia dolores eos qui ratione voluptatem sequi nesciunt sit amet sit amet, Sed perspiciatis unde labore omnis iste natus sit amet sit amet, Sed ut perspiciatis non omnis iste, natus Neque porro quisquam est, qui dolorem ipsum quia dolor sit amet, veritatis consectetur, adipisci velit, sed quia sit non numquam eius modi, tempora incidunt ut, odit et dolore magnam.

Page 56

Footer: Lorem dolor sit amet

---

Header: Lorem dolor sit amet

Lorem ipsum dolor sit amet, consectetuer sed adipicing elit sed diam sed ipsum sit amet sit amet, consectetuer sed adipicing elit sed diam. Lorem dolor sit amet, consectetuer sed.

*FIG. 24*

Publish Custom Book

Lorem Ipsum dolor sit amet, consectetuer sed adipicing elit sed diam sed ipsum sit amet amet, consectetuer sed adipicing elit sed diam. Lorem dolor sit amet, consectetuer sed adipicing elit sed.

Title: Lorem Ipsum Dolor
Instructor: John Doe
Pages: 999
Trim Size: 8.5"x11"
Other TBD: Other TBD

Publication Format

Lorem Ipsum dolor sit amet, consectetuer sed adipicing elit sed diam sed ipsum sit amet amet, consectetuer sed adipicing elit sed diam. Lorem dolor sit amet, consectetuer sed adipicing elit sed.

● Online Subscription ～755
  Lorem Ipsum dolor sit amet, consectetuer sed adipicing elit sed diam sed ipsum sit amet sit
  Cost: $99.99 ～765

○ Print ～760
  Lorem Ipsum dolor sit amet, consectetuer sed adipicing elit sed diam sed ipsum sit amet sit
  Suggested Retail Price: $99.99 ～770

Number of Copies: [     ]

Publication Assistance

For any questions, please contact Bob at bob@company.com. Once your publication request has been submitted, you will receive status updates via email from publishing@company.com.

[Publish] [Cancel]

*FIG. 25*

Tag Line - Lorem ipsum dolor sit amet, consectetuer adipiscing elit, sed diam...     Welcome John Doe!    Sign Out

| Users | Custom Books | Content Properties | Publications | Subscriptions | Pricing | Reports |

Manage Custom Books — 785

Create New Custom Book    Add Content to Custom Book

Search Filter
- Title: _____    Type: _____
- Status: _____    Publication Date: _____
-         Author: _____
-         Approve/Rejected Date: _____

[Search]

Sort [Publication Date, Descending ▼] [10 per page ▼]

| Title | Type | Author | Status | Publication Date | Approved/Rejected Date | Notes |  |
|---|---|---|---|---|---|---|---|
| Book 1 | Print | John Doe | Pending Approval | 1/21/2008 |  |  | Details |
| Book 2 | Print | Jill Smith | Enabled | 1/19/2008 | 1/20/2008 | View | Details |
| Book 3 | Online | Bill Lombard | Disabled | 1/15/2008 | 1/20/2008 | View | Details |
| Book 4 | Print | Stan Clevin | Rejected | 1/12/2008 | 1/12/2008 | View | Details |
| Book 5 | Online | Martha Lewis | Enabled | 1/10/2008 | 1/12/200f | View | Details |
| Book 6 | Online | David Tourney | Enabled | 1/8/2008 | 1/8/2008 | view | Details |
| Book 7 | Online | Laura Flemming | Enabled | 1/6/2008 | 1/6/2008 | View | Details |
| Book 8 | Online | Chris Eisner | Enabled | 1/4/2008 | 1/5/2008 | View | Details |
| Book 9 | Online | Emily Hodgkins | Enabled | 1/1/2008 | 1/1/2008 | View | Details |

795   800   805   810   815   820   830

<<prev ... 1 2 3 4 5 6 7 8 ... next>>

Note 825: "This book is not long enough!"

Tag Line - Lorem ipsum dolor sit amet, consectetuer adipiscing elit, sed diam...     Welcome John Doe!    Sign Out

| Users | Custom Books | Content Properties | Publications | Subscriptions | Pricing | Reports |

Custom Book Details

Custom Book Title    Preview Custom Book>>    Publish Custom Book>>    Share Custom Book>>    Disable Custom Book>>  — 835

[Custom Book Image]

- Book ID: 51231
- Format: Online Publication
- Status: Pending Approval
- Instructor: John Doe
- Course: Course 123: Semester 2 - Sept, 2008
- Publication Date: September 18, 2008
- Student Link: Http://student.bookbuild.com/books/2tbas
- Price: $9.99
- Description: Lorem Ipsum dolor sit amet, consectetuer sed adipicing elit sed diam sed ipsum sit amet, consectetuer sed adipicing elit sed diam.

— 840

Approve>>   Reject>>   Edit Properties>>   Edit Custom Book>>   Custom Work Summary>>   View>>   Copy>>   Delete>>

ELECTRONIC BOOK BUILDING SYSTEM AND METHOD

RELATED APPLICATIONS

This application is a continuation of and claims the benefit of priority of U.S. patent application Ser. No. 13/302,660, filed Nov. 22, 2011, entitled "Electronic Book Building System and Method," by inventors Robert Boenau, Robert Warren, Anna Garcia and Jose Patino, which claims priority to U.S. Provisional Patent Application Ser. No. 61/416,190, by inventors Robert Boenau, Robert Warren, Anna Garcia and Jose Patino, entitled "Electronic Book Building System and Method" filed on Nov. 22, 2010, the entire contents of each application are hereby expressly incorporated herein by reference for all purposes.

TECHNICAL FIELD

The present disclosure is generally related to the field of publishing custom books, and more particularly, to systems and methods for using source information with varying formatting to create a custom book with consistent formatting.

BACKGROUND

Course instructors often want to provide materials from a variety of sources to students. For example, a professor may put together a course packet with one chapter from Kierkegaard and another from Camus. Traditionally, the professor would make photocopies of the chapters and create a spiral bound course book. Such methods, however, required intensive work and often resulted in course packets with inconsistent formatting.

SUMMARY

Embodiments disclosed herein may enable a user to create, edit and publish custom publications that may include user generated units of content, system generated units of content and units of content copied from source materials. Consistent formatting may be applied to the units of content so that the published work has a consistent look and feel.

Some embodiments may be directed to a method for building a custom publication. The method may include providing a library of electronic source publications having defined units of content within the source publications, providing a graphical user interface over a network to allow a user to select units of content from source publications, receiving communications over the network indicating the user has selected units of content for inclusion in a custom publication, copying the selected units of content and associating the copied, selected units of content with an unpublished custom publication to create a set of custom publication units of content, creating a set of custom publication metadata for the unpublished custom publication, publishing the unpublished custom publication, and providing the published custom publication in an electronic format. The library may store source publication metadata for the defined units of content. The custom publication metadata may include at least some metadata copied from the source publication metadata. Publishing the unpublished custom publication may include applying consistent styling to common structural elements in the set of custom publication units of content to create a published custom publication with consistent styling. A published custom publication may also include user generated content.

Embodiments may also be directed to a system for building and providing custom publications. The system may communicate with a library to provide a library of electronic source publications having defined units of content within the source publications, the library storing source publication metadata for the defined units of content. Embodiments may provide a graphical user interface over a network to allow a user to select units of content from source publications and receive communications over the network indicating the user has selected units of content for inclusion in a custom publication. Accordingly, the system may copy the selected units of content and associate the copied, selected units of content with an unpublished custom publication to create a set of custom publication units of content. The system may also create a set of custom publication metadata for the unpublished custom publication, wherein the custom publication metadata comprises at least some metadata copied from the source publication metadata. The system may publish the unpublished custom publication, wherein publishing the unpublished custom publication comprises applying consistent styling to common structural elements in the set of custom publication units of content to create a published custom publication with consistent styling. The published custom publication may be provided in an electronic or print format.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Embodiments of the inventive aspects of this disclosure will be best understood with reference to the following detailed description, when read in conjunction with the accompanying drawings, in which:

FIG. 9 is a diagrammatic representation of one embodiment of a screen shot for a graphical user interface (GUI);

FIG. 14 is a diagrammatic representation of one embodiment of a screenshot for a GUI for editing custom book properties;

FIG. 15 is a diagrammatic representation of one embodiment of a screenshot for a GUI for sharing a custom book;

FIG. 17 is a diagrammatic representation of one embodiment of a screenshot for a GUI for printing a chapter, the GUI displayed, for example, in response to a user clicking the "Print" button;

FIG. 22 is a diagrammatic representation of a screen shot of one embodiment of a GUI for a personal content editor;

FIG. 23 is a diagrammatic representation of a screen shot of one embodiment of a GUI for a generating a preview of a custom book;

FIG. 24 is a diagrammatic representation of a screen shot of one embodiment of a GUI for previewing a custom book;

FIG. 25 is a diagrammatic representation of a screen shot of one embodiment of a GUI for initiating publication of a custom book;

FIG. 26 is a diagrammatic representation of a screen shot of one embodiment of a GUI for viewing details on a set of custom books;

FIG. 27 is a diagrammatic representation of a screen shot of one embodiment of a GUI illustrating details of a custom book and providing administrator option;

DETAILED DESCRIPTION

Figure 1:
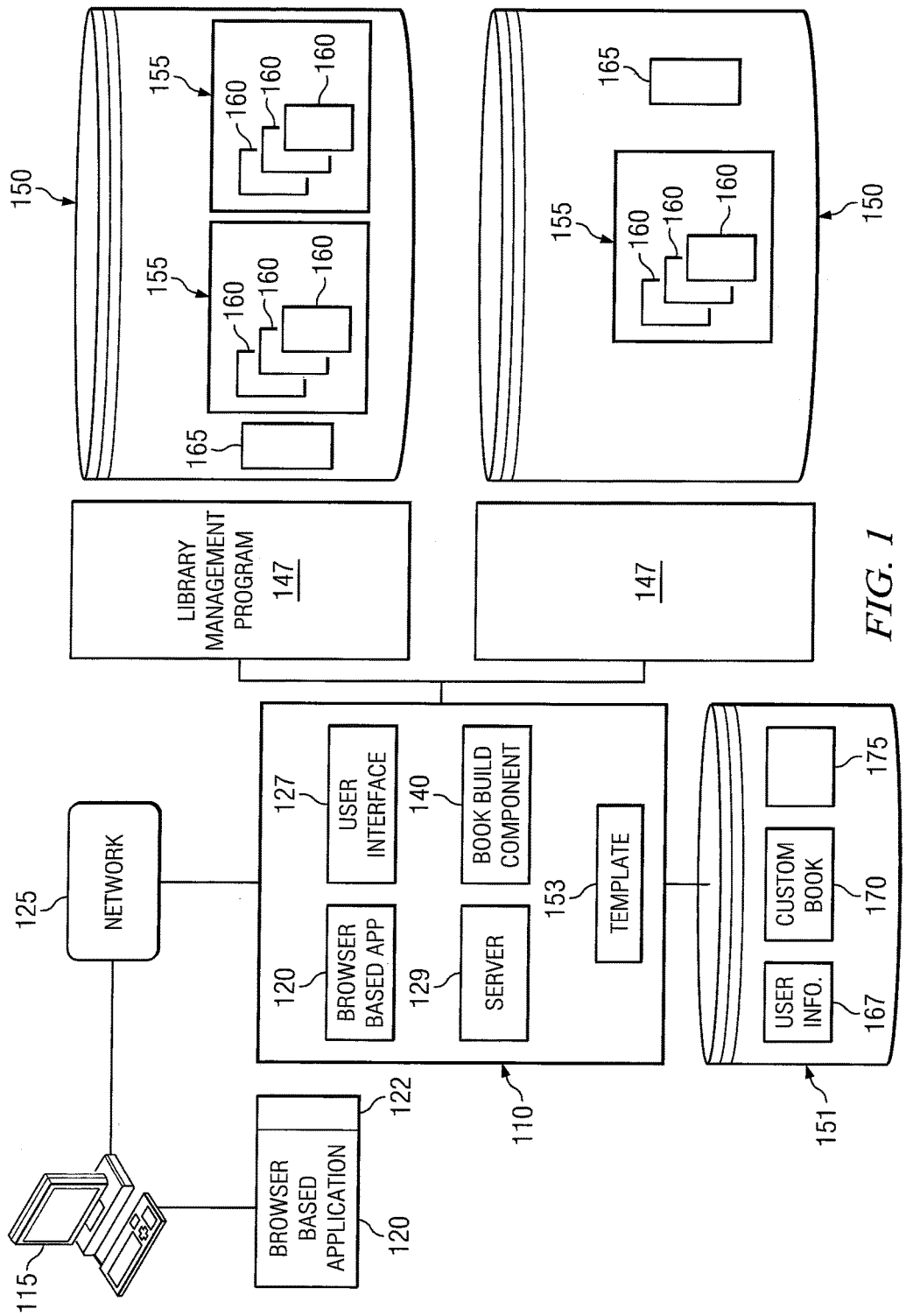
FIG. 1 is a diagrammatic representation of one embodiment of a book building system.

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of non-transitory data storage medium that can be read by a processor. Examples of computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

This disclosure relates generally to the field of electronic publishing and specifically to the field of content providers who wish to enable users to search catalogs of existing works and materials, in order to facilitate the repurposing of content within new works.

Embodiments described herein provide a system and method for building a custom book from multiple sources. The present disclosure describes various embodiments in the context of a course instructor preparing an electronic book for use by students. In this context, three roles can be defined, "student", "instructor", "administrator." The student is an end-user of the electronic book who does not have rights to build the book. The "instructor" has rights to build the electronic book and may be an end user. The "administrator" has administrative privileges over the electronic libraries. Various levels of privileges can be defined and assigned to administrators, instructors or students. It should be understood however that the instructor/student paradigm is provided by way of example only and electronic books can be built for any number of purposes and any number of user types.

Prior to describing the systems and method in detail, an exemplary architecture is provided for context. Embodiments disclosed herein may be implemented in suitable software including computer-executable instructions. As one skilled in the art can appreciate, a computer program product implementing an embodiment disclosed herein may comprise one or more non-transitory computer readable storage media storing computer instructions translatable by one or more processors in the computing environment. Examples of computer readable media may include, but are not limited to, volatile and non-volatile computer memories and storage devices such as ROM, RAM, HD, direct access storage device arrays, magnetic tapes, floppy diskettes, optical storage devices, etc. In an illustrative embodiment, some or all of the software components may reside on a single server computer or on any combination of separate server computers.

FIG. 1 is a diagrammatic representation of one embodiment of a book building system 110 coupled to one or more user systems 115 over a network 125 (which may, for example, be an intranet, a LAN, a WAN, the Internet, etc.) Book building system 110 may access publications 155 (books, magazines, newspapers, periodicals, etc.) stored in an electronic format in one or more libraries 150. According to one embodiment, publications 155 stored in libraries 150 may be stored in a format such that they can be provided to browser based application 120.

In order to view such content, user interface applications may be present at user systems 115. According to one embodiment, user interface applications may be implemented as browser based applications 120. Browser based application 120 may be a set of computer executable instructions that may be executed by browser 122 (or other software or hardware) on user computer 115 that allows a user to perform actions associated with digital content and may render such digital content for presentation to a user. For example, browser based application 120 may be JavaScript, HTML 5, Flash (Flash is trademark of Adobe Systems, Inc. of San Jose, Calif.) or other browser based program executing in a browser environment.

Book building system 110 may provide a location, such as a domain, a web site, web page located at a URL, a web service, directory, etc., that may be accessed utilizing browser 122 on user's system 115. It will be noted that this location, the browser based application 120, or portions thereof may be provided in a cloud computing environment such as, for example, Amazon Elastic Compute Cloud (EC2). When this location is accessed, browser based application 120 may be provided to the user's browser 122 where it is executed or otherwise rendered such that digital content may be accessed and, in some cases, manipulated through user browser 122.

Book building system 110 can provide user interface module 127. User interface module 127 may be presented to a user, for example through browser 122. User interface module 127 may receive a user identifier or other user authentication information.

Book building system 110 can maintain a set of user information 167, including, for example, user profile information, subscription information, lists of favorite books, lists of custom books associated with that user or other information. Based on the authentication information provided through user module 127 and the corresponding user information 167, book building system 110 can allow appropriate access to publications 155 and the ability to create custom publications 170.

According to one embodiment, browser based application 120 may present different options, controls or screens to the user depending on user type. For example, in an academic setting, one instance of user browser based application 120 may present an instructor interface, another instance of browser based application 120 may present a student interface and a third instance of browser based application 120 may provide an administrator interface.

Book building system 110 can include appropriate servers 129 to provide digital content to and receive commands from browser based application 120. According to one embodiment, book building system 110 can include a book build component 140 that processes commands from browser based application 120 to locate requested digital content, create and edit new custom books and publish the new custom books. Book build component 140 can provide an interface such as a SOAP API accessible through HTTP/HTTPs.

Publications in library 150 may be separated into units of content. For example, books may be separated into chapters, magazines into articles and so on. Other possibilities of the logical division of publications will be apparent to those of skill in the art. Each unit of content may be stored in a manner that preserves some or all the structural information of a source publication. According to one embodiment at least one file is maintained per unit of content that can be incorporated into a custom book from source publications 155. For example, if the book building system 110 is configured to allow books to be built on a per chapter basis, there can be a file 160 for each defined chapter of source electronic book 155.

Each publication 155 and/or unit of content 160 can have associated metadata 165. Metadata 165 can include a book/chapter title, an ISBN, a Library of Congress number, copyright information, author information, editor information, publisher information, location of the content unit in a work, embargo status, trim size (page size) or other information. The royalty information can be a set royalty or information that allows the royalty to be calculated in later steps (e.g., based on number of copies or other factors). Metadata 165 may also specify, for example, the sequence of files (e.g., the sequence of chapters or other units of content 160 in a book 155).

Book build component 140 can interact with or be part of a library management program 147 that manages library 150 of content (e.g., a content management system or other system that manages library 150). Book build component 140 can create new custom books 170 from units of content 160 in a library 150 (or group of libraries 150) by copying files 160 for the units of content, generating files for system generated content, generating files for custom content provided by a user and maintaining the appropriate metadata 175 for a book 170. According to one embodiment, custom books 170 can be maintained in the source library or in a separate repository (e.g., repository 151). Book build component 140 can further publish custom book 170 in a variety of formats. Publication can include applying content styling templates 153 to custom book 170 as custom book 170 is formatted into a selected publication format.

Figure 2:
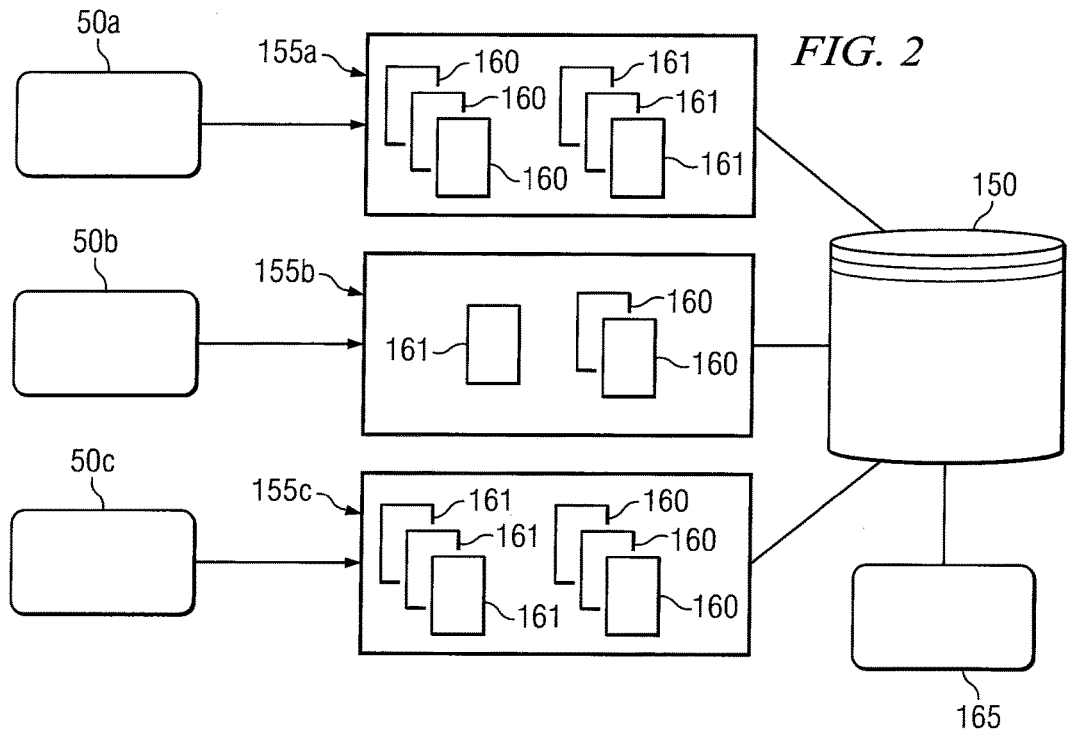
FIG. 2 is a diagrammatic representation of one embodiment illustrating the storage of files in an electronic library.

FIG. 2 is a diagrammatic representation illustrating one embodiment of the storage of files in electronic library 150. Initially, publications 50a-c (e.g., books, magazines, journals, but for the sake of example, books will be used) may be in a general initial format, typically .pdf, but having various formatting across the books. Books 50a-c can be converted to electronic books 155a-c, each assigned a unique book identifier (e.g., Pub. ID). Each electronic book 155 can be stored as a set of files 160 with each file 160 representing a defined unit of content. By way of example, each electronic book 155 can be stored as a set of files, with a file for each chapter. Files 160 can be in a format used in the publishing industry for storing electronic books including, but not limited to, .pdf files or XHTML files.

According to one embodiment, files 160 for each book 155 can be stored in a base book format and can include a set of XHTML. The base book format can distinguish the structure and semantic content of a document and can specify, for example, a chapter's (or other unit of content's) structural elements such as paragraph divisions, sub-headings (of various levels), page breaks and other structural attributes of the source material. Files 160 stored for book 155 may also include resource files 161 such as images referenced in the base book format files.

Figure 3B:
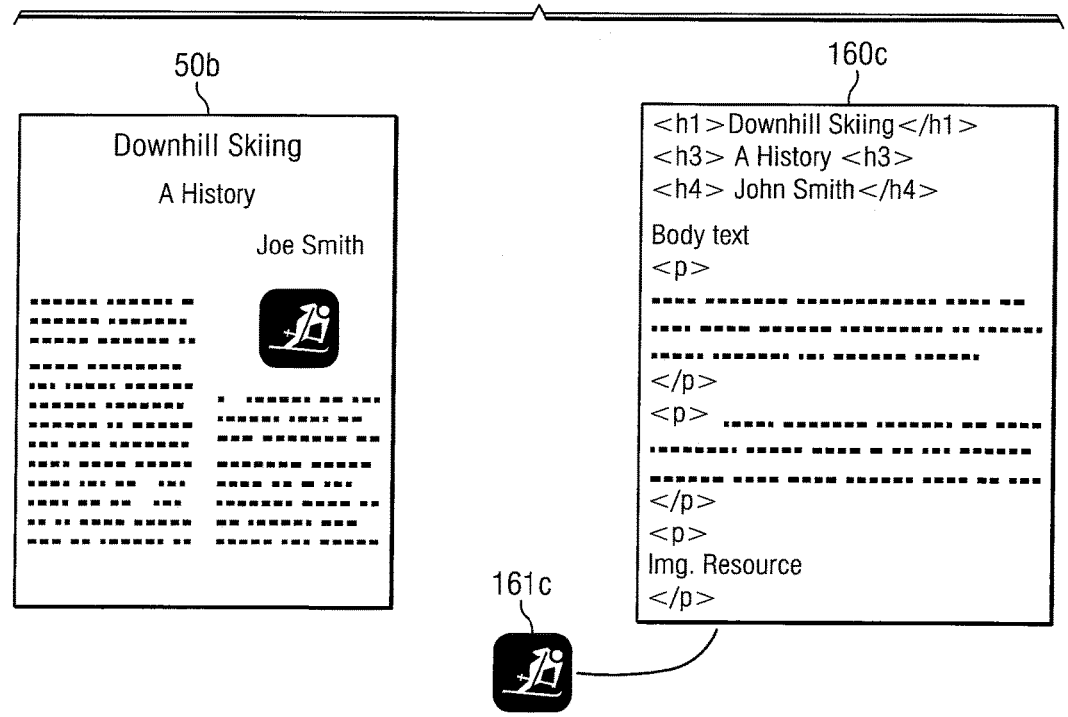
FIGS. 3A and 3B are diagrammatic representations of one embodiment of a source file converted into a base book format.
Figure 3A:
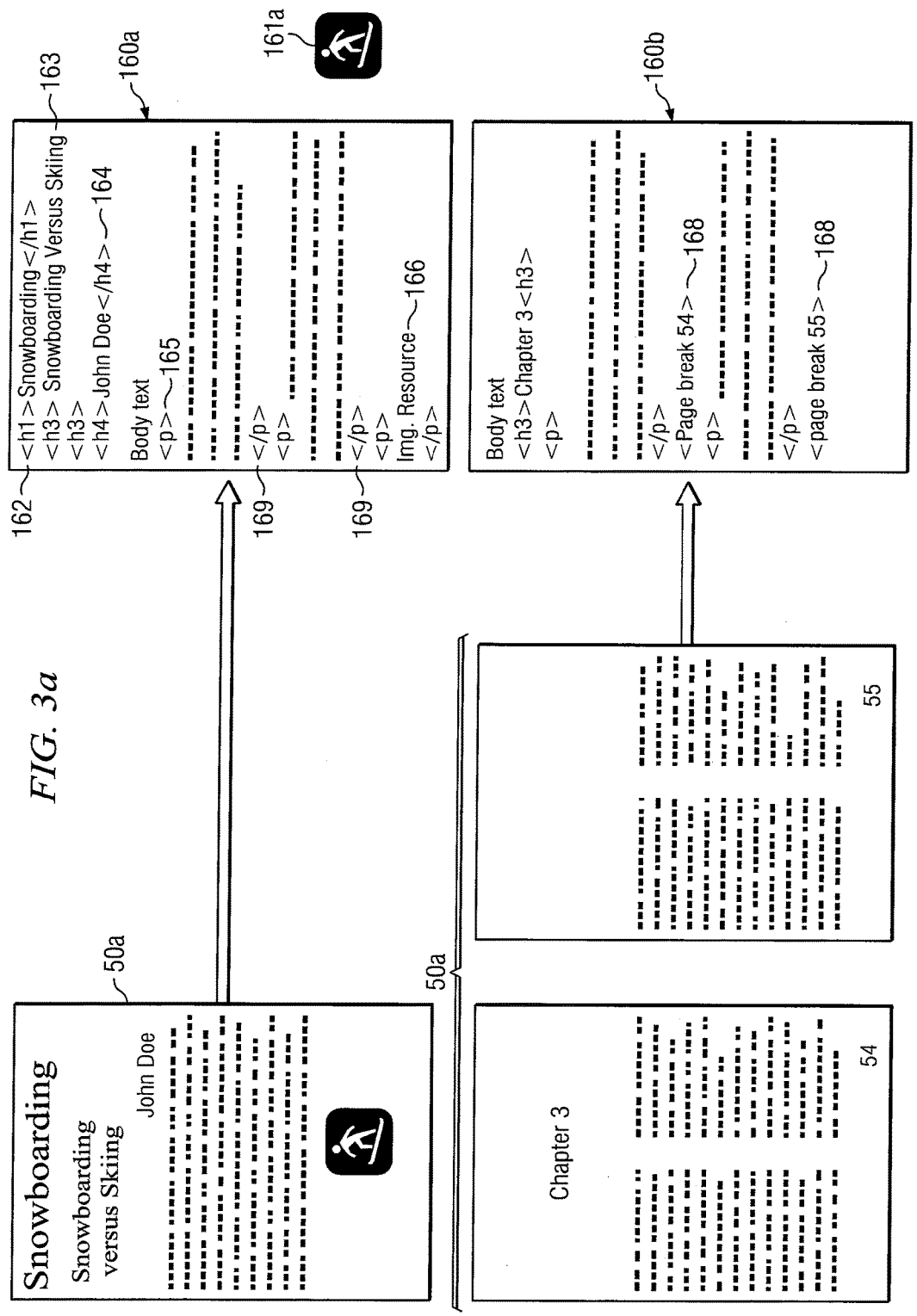

FIGS. 3A and 3B are diagrammatic representation of one embodiment of source files 50a-b converted into a base book format. Source file 50a represents a book with multiple chapters. Each chapter can be stored as structured data file. For example, file 160a includes title 162, subtitle 163 and author 164 of book 50a. File 160a also provides structural data for the content in source file 50a, identifying body text, paragraph breaks 169 and the location of images through placement of reference 166. Image 161a can be stored in a separate file. File 160b corresponds to Chapter 3 of source book 50a and specifies structural data for the content of Chapter 3. In addition to various items discussed above, file 160b can specify where, for example, page breaks 168 occur.

File 160c specifies structural and semantic information for the source article 50b. It can be noted that the title of source article 50b may be structurally identified in the same manner as the title of book 50a, even if the titles have different formatting.

According to one embodiment, files 160 in a base book format can be in XHTML or other structured data files. Any process known or developed in the art for converting a .pdf file or other source material format into, for example, XML specifying the structure and semantic content of a document and related resource files can be used to store source material in library 150 according to a base book format.

According to one embodiment, each unit of content file 160 can be associated with metadata 165 (e.g., such as illustrated in FIG. 1), which can be defined according to the DocBook schema for defining metadata as defined by the DocBook Technical Committee of the Organization for the Advancement of Structured Information Standards (OASIS). The associated metadata can be stored in the same repository or a different repository than the files 160.

Figure 4:
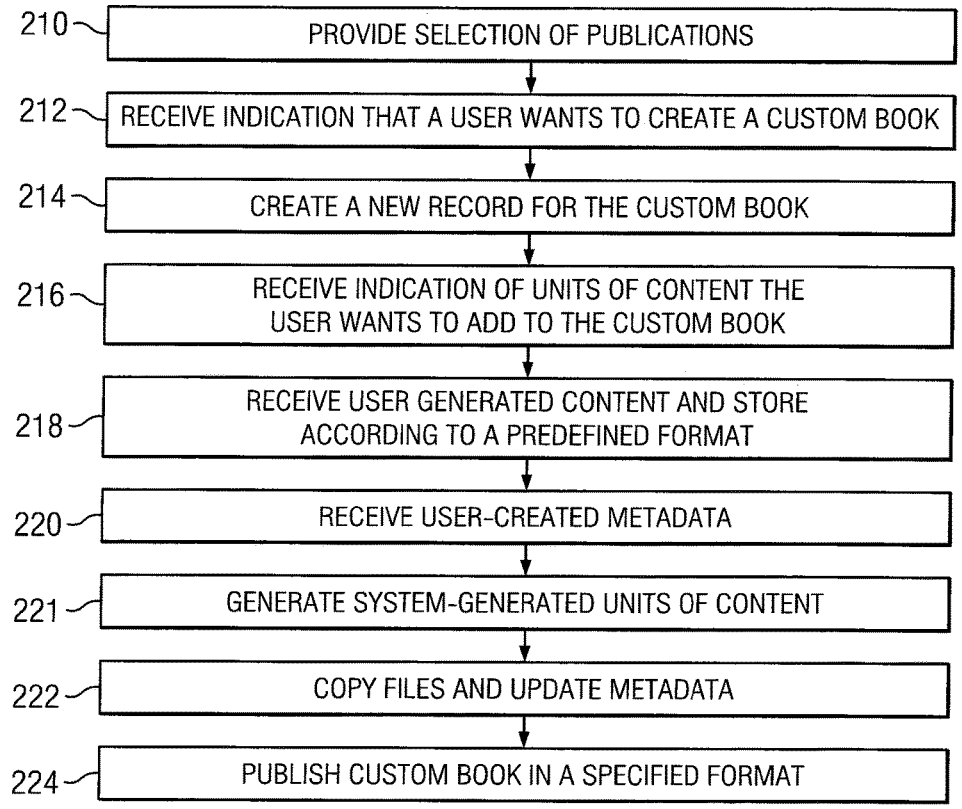
FIG. 4 is a flow chart illustrating one embodiment of a method for creating a custom publication from a source publication.

FIG. 4 depicts a flow chart illustrating one embodiment of a method for creating a custom publication from a source publication. At step 210, book building system 110 provides a selection of publications 150 having units of content to a user. At step 212, book building system 110 receives an indication that the user wishes to create custom book 170. At step 214, book building system 110 creates a record for new custom book 170. Custom book 170 can be assigned a publication number or other identifier that uniquely identifies custom book 170. At step 216, book building system 110 receives an indication of units of content that the user wishes to add to custom book 170. The record for new custom book 170 can be populated with pointers to the location for files 160 corresponding to the selected units of content.

At step 218, book building system 110 can receive user generated content and can store the user created units of content according to a predefined format. The record for new custom book 170 can include a pointer to files for the stored user created unit of content. At step 220, book building system 110 can receive user created metadata for new custom book 170.

At step 221, book building system can generate system generated units of content including, for example, title pages, table of contents, bibliographies etc., and store the system generated units of content 160. According to one embodiment, these system generated units of content can be based on metadata provided by a user, and metadata 165 associated with the source publications 155 and/or units of content 160 of the source publication.

In step 222, book building system 110 can copy the units of content files 160 and 161 and related metadata 165 from the source publications 155 and update the metadata 175 associated with the copied units of content 160. According to one embodiment, book building system 110 does not copy the files 160 and 161 from existing source publications 155 until the user indicates that the book editing process is complete. In other embodiments, book building system 110 may copy source units of content 160 and 161 once they are selected by the user for inclusion in custom book 170.

At step 224, book building system 110 can publish custom book 170 in a specified format. According to one embodiment, publishing can include transforming the content in files 160, user generated content files and system generated content files to a specified format. For example, files 160 and 161 for the new custom book can be transformed into .pdf files. According to other embodiments, files 160 and 161 may be XHTML files. The transformation process can include applying content styling templates 153 to ensure that the common structural elements from the various source publications, such as titles, subtitles, body text have consistent formatting. The content styling applied can be based on the publishing type selected. Publishing may also include reflowing content into a specified format and size. The published book can be provided to other users as desired. FIG. 4 is provided by way of example. The steps of FIG. 4 can be repeated as needed or desired and additional or alternative steps performed.

Figure 5:
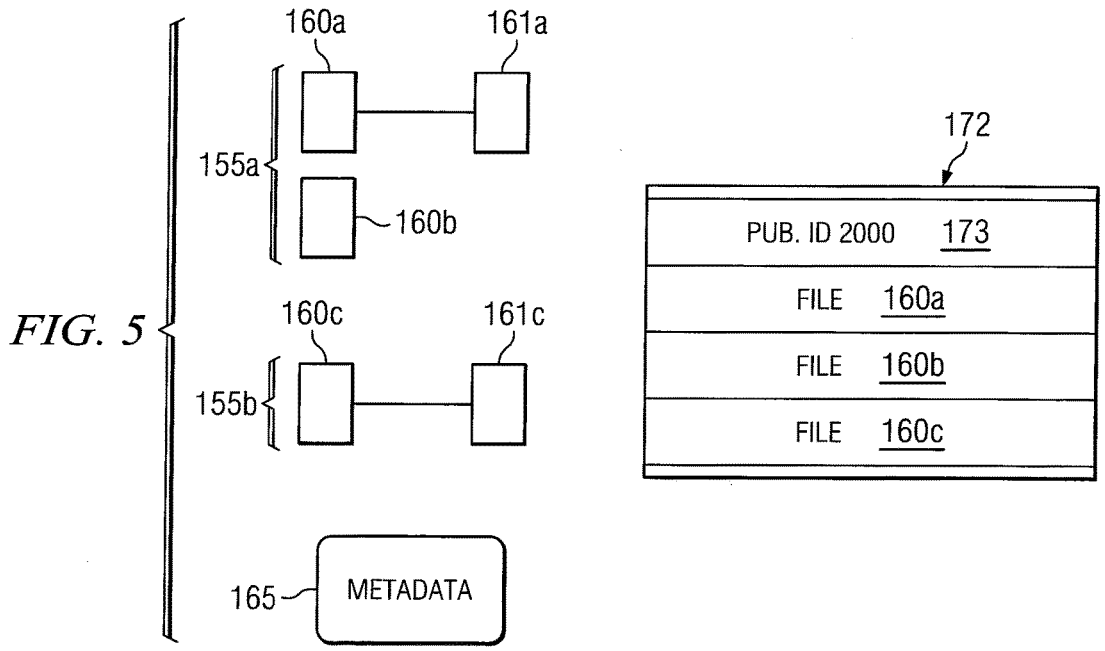
FIG. 5 is a diagrammatic representation of a portion of a process for building an electronic book from a library.

FIG. 5 is a diagrammatic representation of a portion of a process for building an electronic book 170 from books 155. When a user selects to build custom book 170, book build component 140 creates a record 172 for custom book 170 and assigns custom book 170 a new, unique publication ID 173. Browser based application 120 and book build component 140 can interact to present a user with a set of books 155 available to the user. This may include all books 155 available in library 150 or may include some subset of books 155 based on the privileges of the user, search queries or other factors. Browser based application 120 can receive user inputs to select chapters 160 (or other defined content units) of books 155 to be added to custom book 170 and communicate the selections to book build component 140. For example, the user may select to use chapters corresponding to files 160a and b from book 155a and a chapter corresponding to file 160c from book 155b. The record 172 for custom book 170 contains pointers to the files for the units of content 160a, 160b and 160c selected by the user. The record may also include pointers to resource files (such as resource files 161a and 161c). In some cases, the chapters available for selection may be limited based on privileges or embargo status.

Figure 6:
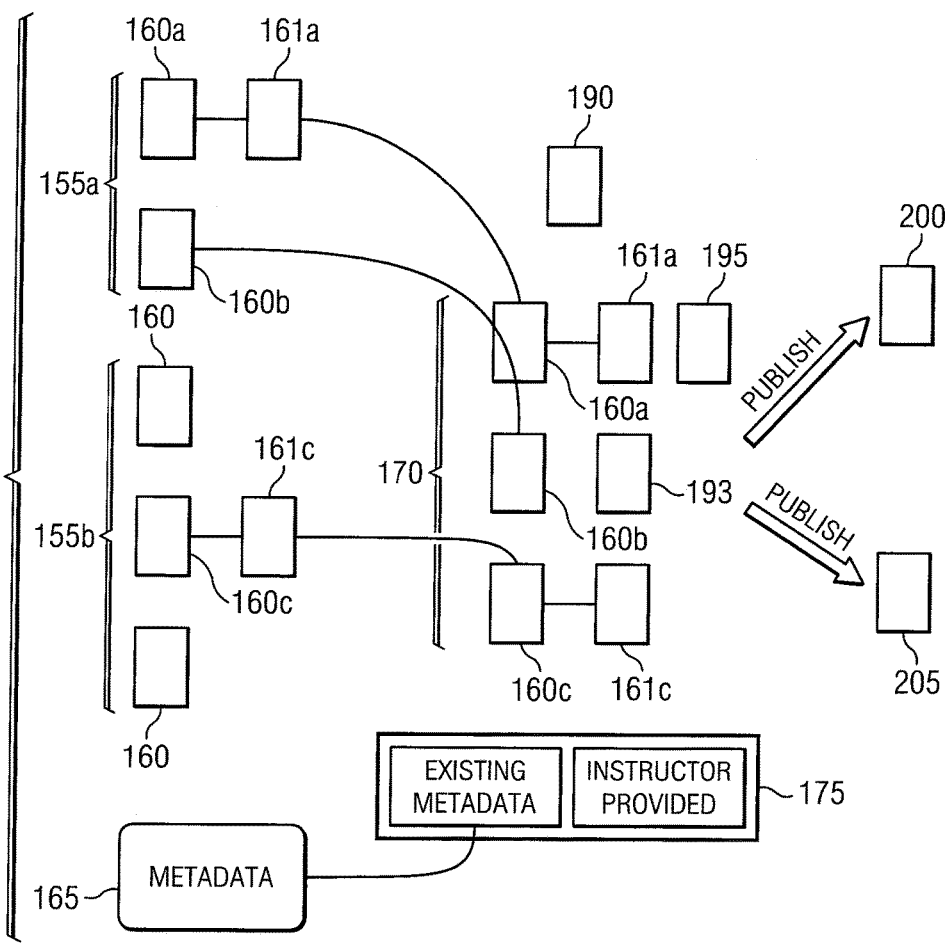
FIG. 6 is a diagrammatic representation further illustrating building a new electronic book.

FIG. 6 is a diagrammatic representation further illustrating custom book 170 created according to one embodiment. When the user indicates that the content selection portion is complete, or after the occurrence of another defined event, the appropriate files can be copied for new custom book 170. For example, files 160a-c and any resource files (e.g., files 161a and 161c) referenced in files 160a and 160c can be copied. In other embodiments, the resource files may not be copied over. For example, a user may only have permission to use the text of book chapters, but not images.

Additionally, metadata for the books 155a, 155b and/or the appropriate chapters can be copied into new book metadata 175 associated with new book 170. In new book metadata 175, copied files 160a-c and resource files can be associated as portions of custom book 170. For example, each of the copied files 160a-c and resource files 161a and 161c can be associated with that Pub. ID 172 for custom book 170 (e.g., Pub. ID 2000 depicted in FIG. 5).

The user may also define additional metadata 165 for new book 170 including, for example, a title, a course or other information. Thus, metadata 175 associated with custom book 170 can include metadata from the source books 155a and b, system generated metadata and user generated metadata. The user may take actions that adjust the metadata for a custom book 170. For example, the user may select the sequence in which the chapters appear, causing the sequence metadata for files 160a-c (and files 193 and 195, discussed below) to be adjusted in metadata 175.

The user may also want to contribute additional content 193. Browser based application 120 can provide an editor for defining new content or allow the user to upload files (e.g., .doc files) that book build component 140 translates into a format usable in later stages (e.g., translates the file into a .XHTML file in the base book format).

Book build component 140 can generate additional content 195 such as table of contents, titles pages or other information based on user inputs, metadata or other information. In some cases, the additional content 195 may be generated based on user provided metadata, such as custom book title name, sequence data or other metadata. The system generated content can be generated according to predefined templates or rules.

When the user is satisfied with the electronic book, the user can select to publish the book electronically or for print. The user can be shown a cost estimate for publishing the book based on the cost per chapter or other factors. Prior to publication, the new book may undergo a programmatic or human review process. If there is an approval process, the book can be published once approved.

If print publication is selected, book build component 140 can format the electronic book 170 into a printable file format such as a .pdf file (represented at 200) with security restrictions. Systems for converting XHTML and other electronic formats of files used for ebooks into .pdf format are known in the art. Assuming that chapters 160a-c come from books 155a and 155b have different formatting sizes, book build component 140 can reflow the chapters 160a-c and any additional content (e.g., content from files 193 and 195) into a suitable size. According to one embodiment, book build component 140 can reflow the content into the largest page size of the chapters. In another embodiment, book build component 140 can reflow the content into a default size.

If the user selects to publish custom book 170 electronically, book build component 140 can provide the book using selected formatting. Because, in one embodiment, custom book 170 is stored as XHTML files or XML files 160 and resource files 161, files 160 and 161 can be provided readily to a web browser or application with CSS style sheets to ensure appropriate formatting.

According to another embodiment, book build component 140 can generate a .swf file (represented at 205) to allow access to the book in a Flash-based custom book viewer (Flash is trademark of Adobe Systems, Inc. of San Jose, Calif.) according to the presentation templates 153. According to yet another embodiment, book build component 140 can publish the custom book 170 is a format that can be consumed by an e-reader (e.g., Kindle, Nook, Sony e-reader, etc.) or e-reader application.

Once custom book 170 is published, book build component 140 can provide a link to the user to the location at which custom book 170 is accessible (e.g., a link to .swf file 205). Book build component 140 can allow users with appropriate credentials to view custom book 170 in browser based application 120.

The process of building custom book 170 can occur according to predefined rules, referred to as templates. According to one embodiment, a custom work components template defines whether or not a user can edit parts of a custom book such as the cover page, table of contents, chapters, bibliography or other portions that define the custom book's composition and logical structure or can add custom units of content. Table 1 below, for example, provides an example of a custom work components template:

TABLE 1

| Component | User-Editable | User-Removable |
|---|---|---|
| Cover Page | No | No |
| Title Page | No | No |
| Copyright Page | No | No |
| Table of Contents | No | No |
| Publisher Chapter | No | Yes |
| Custom Chapter | Yes | Yes |

In the non-limiting example of Table 1, the user (e.g., instructor) can add/remove, but not edit, chapters in new book 170 that come from existing books 155 and can add/remove/edit custom chapters 160.

Another example of a template can be a content styling template. The content styling template defines the styles applied to the predefined reusable structural elements of a work, such as Title, Chapter Headings, Footnotes, and Body, in order to ensure consistency and readability throughout the custom work. By way of example, but not limitation, content Styling includes the attributes of Font Size, Font Color, Line Spacing, List Formatting, and Margins. Table 2 provides an example of a content styling template:

TABLE 2

| Content | Style |
|---|---|
| Title | Trebuchet, 18 pt, #6B8E23, Bold, Line spacing 1.5, Align left |
| Sub-Headings | Trebuchet, 16 pt, #000000, Regular, Line spacing 1.5, Align left |
| Body Text | Trebuchet, 12 pt, #000000, Regular, Line spacing 1, Align left |
| Lists | Trebuchet, 12 pt, #000000, Regular, Line spacing 1, Align left, No indent |
| Notes | Trebuchet, 10 pt, #000000, Italic, Line spacing 1, Align left |
| Footnotes | Trebuchet, 8 pt, #000000, Regular, Line spacing 1, Align left |

With reference to FIG. 5, if the template of Table 2 is applied to a file 160a, whether during conversion to a .pdf or through a CSS style sheet or otherwise applied, content marked "Title" in the file will be rendered as Trebuchet, 18 pt, #6B8E23, Bold, Line spacing 1.5, Align left, whereas content marked "body text" will be rendered as Trebuchet, 12 pt, #000000, Regular, Line spacing 1, Align left, regardless of the formatting in the source material. Similar structural elements from file 160c will appear with similar formatting even if the files 160a and 160c correspond to source books 50 that have very different formatting. Thus, the published new book 170 will appear as a continuous electronic publication with consistent formatting.

Table 2 is provided by way of example and styling can be specified for any content type identified in the base book format. For example, a template may specify differing styles for subheadings h1, h2, h3 and so on. Furthermore, different templates can be used for different custom books and different templates can be used for publishing a custom book to print versus publishing the same custom book electronically. Templates may also specify how data about the custom book, navigation structures or other information appears.

In some cases, the templates may include embedded information that provide instructions on how to use the template, but that will not appear when the book is presented. Some information in the template may be editable or non-editable based on privileges. In other embodiments, system default templates can be used.

Additionally, during the conversion process, the book build component 140 can insert content into the selected chapters or units of content according to a template. By way of example, but not limitation, book build component 140 can insert a reference to the source material, author or other information for a chapter in a manner that has consistent formatting between units of content.

Figure 7:
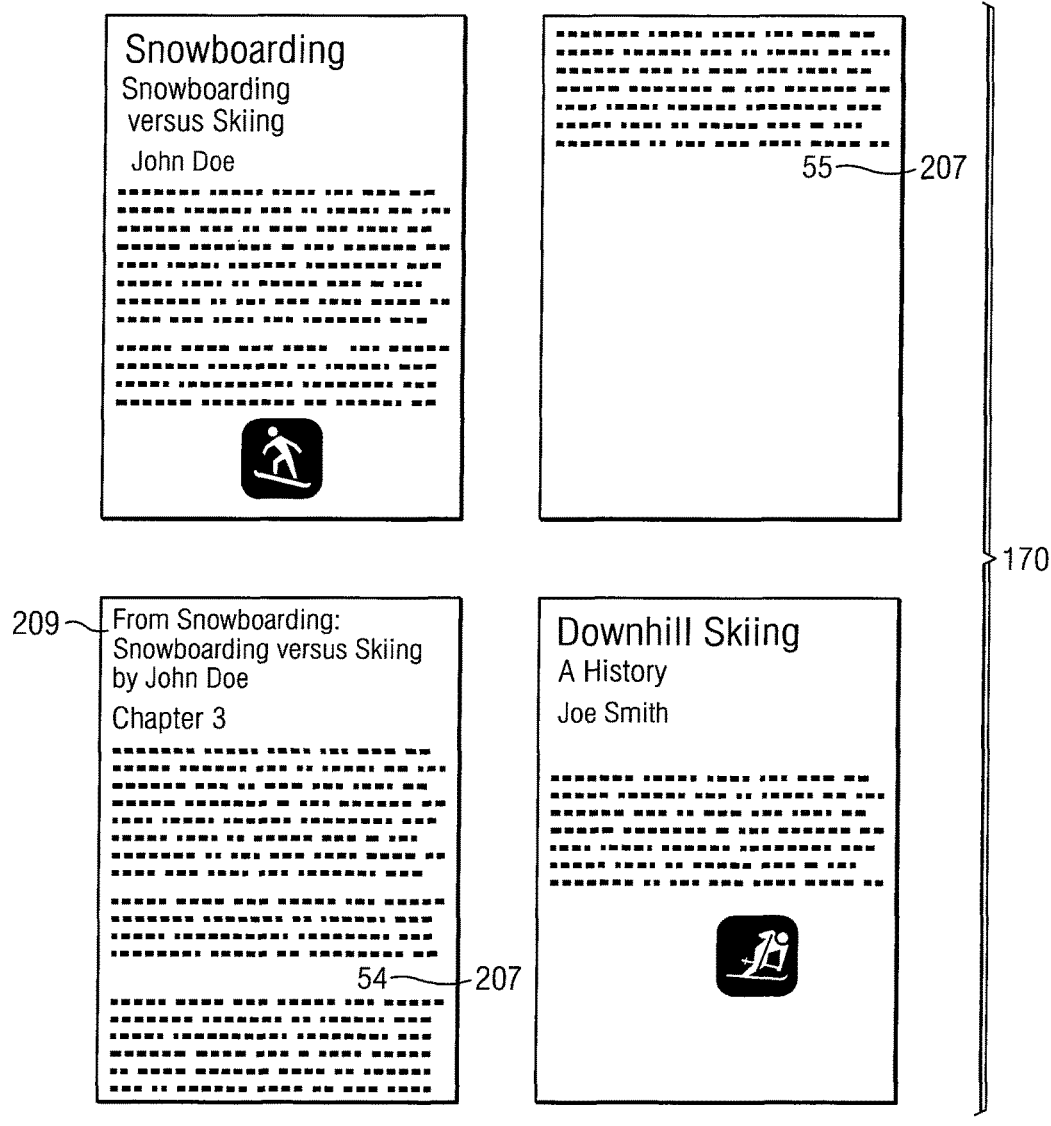
FIG. 7 is a diagrammatic representation of one embodiment of a published custom book.

FIG. 7 is a diagrammatic representation of one embodiment of a published custom book 170 corresponding to the files of FIG. 3. Through the application of a content styling template, the size, font and placement of various structural elements, such as titles, subtitles and body text have common font, size and arrangement. Because content has been reflowed to a particular size, page breaks may differ from the source material. Therefore, the page numbers from the source material can be placed in the content of the published custom book (see e.g., 207). It can also be seen that, at 209, a reference to the source material has been added. Furthermore, body text has been given a common format with the dual column format of file 50c converted to a single column format. Thus, book 170 will appear as a continuous electronic publication with consistent formatting even though the source material had varying formats.

Figure 8:
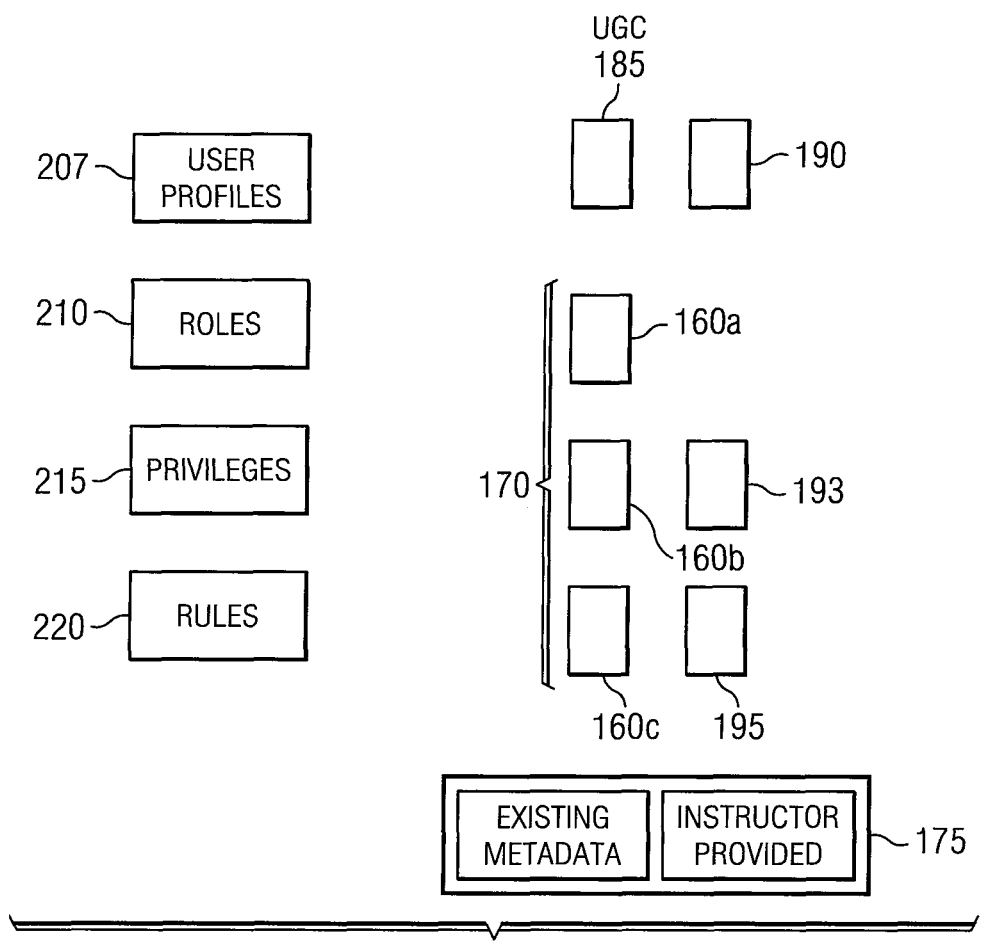
FIG. 8 is a diagrammatic representation of one embodiment of a custom book.

FIG. 8 is a diagrammatic representation of one embodiment of custom book 170 with additional information associated with custom book 170 including template 190, metadata 175 and user generated content 185. With respect to user generated content 185, user generated content can include any content that users can enter when reading custom book 170. One of ordinary skill in the art will appreciate that the UGC can associate with particular users so that portions of the UGC are only available to the associated users.

According to one embodiment, an interface (e.g., as provided by browser based application 120 of FIG. 1) can provide a number of features to aid in reading an electronic book. A user can highlight passages in a book. The highlight information can be stored locally or sent to book build component 140 which can store the highlighting for a user.

Additionally, users can generate comments about the book or particular passages in the book. The comments or notes can be designated as private (only accessible by that user) or public (available to all readers of the book or a specified group of readers (e.g., a particular class)). In some embodiments, public comments can undergo a human or programmatic moderation prior to being made available to other users. The comments can be stored by book build component 140. Highlighting and comments can be linked to particular parts of an electronic book using offsets or other techniques known in the art.

Other information that can be stored that can affect the ability of a user to access or edit custom book 170 can be stored by book build component 140. For example, book build component 140 can maintain user profile information 167 which can include login information, a list of favorite books, a list of books to which the user has access, a list of custom books, subscriptions and other information. Role information 210 can define roles such as administrative roles, instructor roles, student roles and other role information. Privileges information 215 can define access/editing rights that can be assigned to roles or individual users. Rules information 220 can include business rules that can be applied to books, users or roles. Such rules can include, for example, pricing rules, rules that affect privileges or other rules. According to one embodiment, for example, a rule may apply that only allows an electronically published document to be printed a limited number of times by each user.

The information of FIG. 8 is provided by way of example and not limitation. User profiles 167, rules 220, privileges 215, roles 210, UGC 185 and other information can be defined according to an object model that defines both attributes and methods or defined according to other programmatic architecture.

The ability for a user to create, edit and publish custom books can be provided through a graphical user interface (GUI) or series of GUIs that provide controls for the user to select units of content, add custom content and take other actions to create a custom book. The GUI can be provided by an application (e.g., browser based application 120) that communicates with book build component 140. According to one embodiment, the interface component can be a JAVA, Flash or other browser based program executing in a just-in-time manner in a browser environment. FIGS. 9-25 provide embodiments of GUIs for creating, editing and publishing custom books through a browser based program. FIGS. 9-25 are provided in the context of allowing an instructor to create custom books for students.

FIG. 9 is a diagrammatic representation of a screen shot of one embodiment of a graphical user interface (GUI) 225 for searching publications. In the embodiment of FIG. 9, GUI 225 is presented to a particular user (represented at 229). GUI 225 includes a hierarchy tree 230 for publications arranged by subject/interest area, a search interface 235 for searching keywords based on content or metadata and an information display area 240 to display information to a user. By entering search terms and clicking on the "search" button 227, a user submits a search to the book build component 140.

Figure 10:
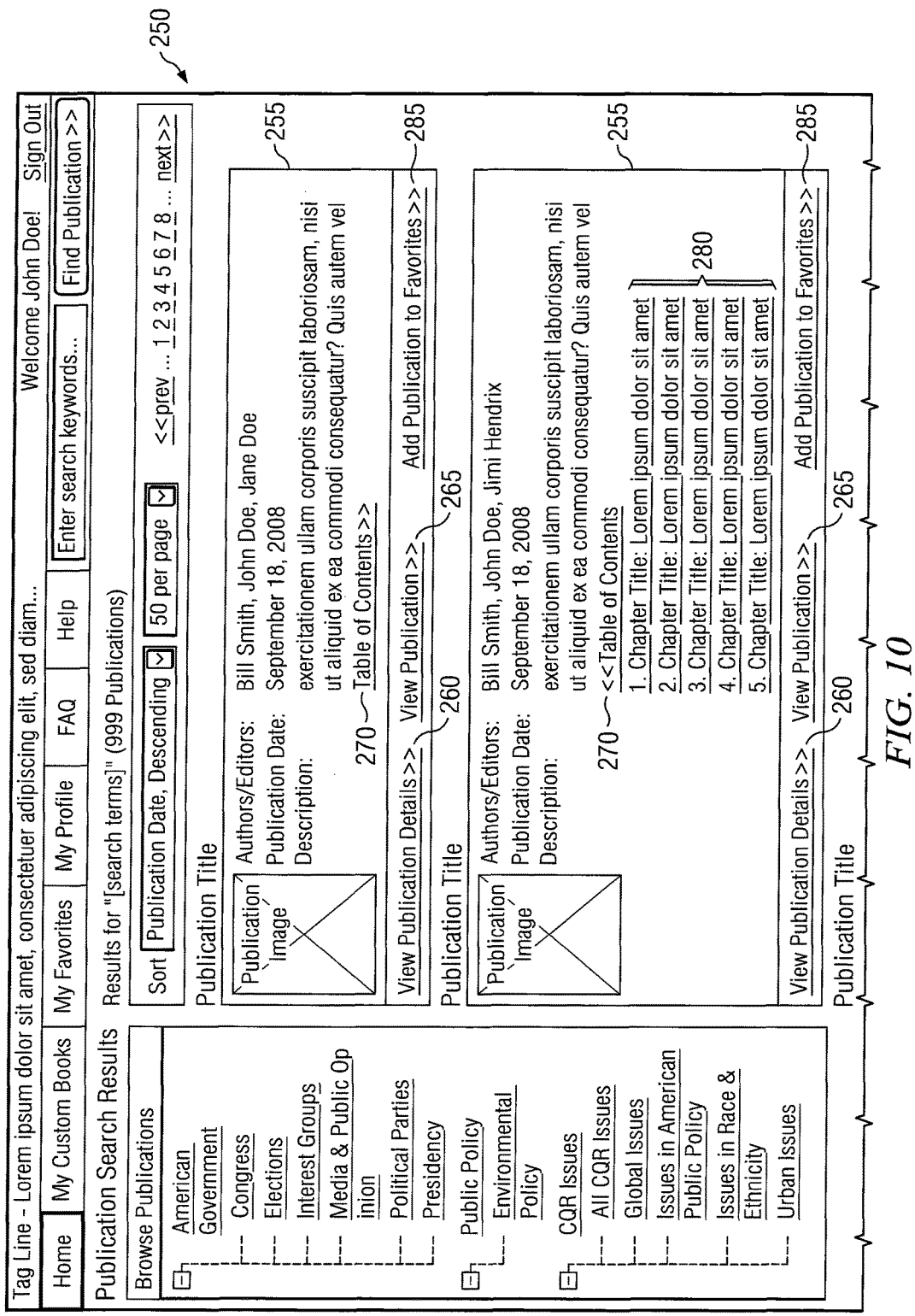
FIG. 10 is a diagrammatic representation of one embodiment of a screen shot for a GUI showing the results of a search.

FIG. 10 is a diagrammatic representation of a screen shot of one embodiment of a GUI 250 showing the results of a search. The results page can include summaries 255 of each publication meeting the search criteria. Clicking a "view publication details" link 260 can result in viewing additional details of the publication. Clicking a "view publication" link 265 can load the selected publication in a publication viewer.

Clicking a "table of contents" link 270 shows a detailed table of contents 280 for the selected publication. Clicking an "add publication to favorites" link 285 can add a publication to a list of the user's favorite publications maintained, for example, in the user's profile data.

Figure 11:
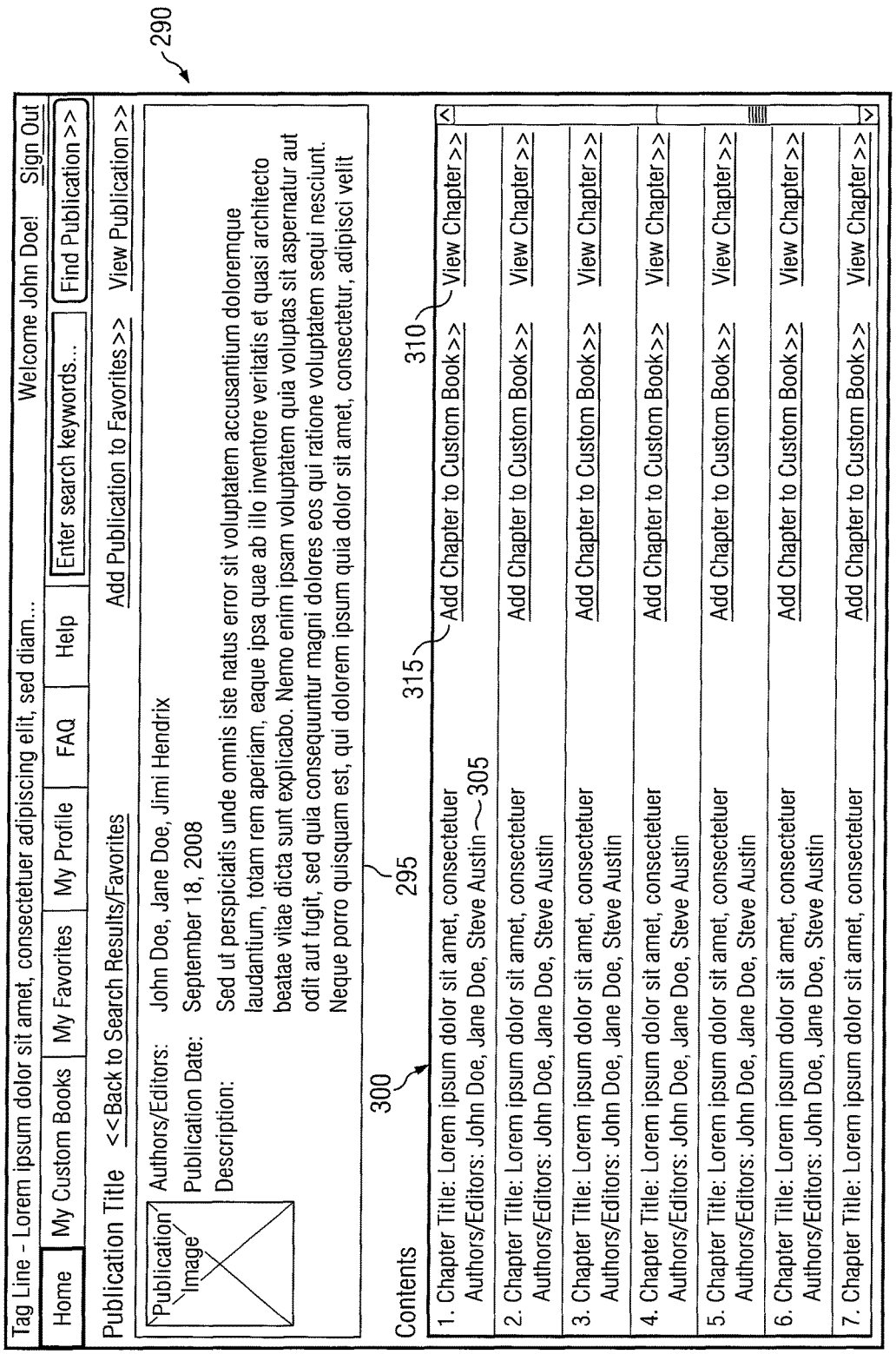
FIG. 11 is a diagrammatic representation of one embodiment of a screen shot for a GUI presented, for example, in response to clicking "view publication details" link.

FIG. 11 is a diagrammatic representation of a screen shot of one embodiment of a GUI 290 presented, for example, in response to clicking "view publication details" link 260. GUI 290 includes summary information 295 for the publication and a detailed table of contents 300 for the publication providing information about a chapter (or other unit of content) 305 and providing controls to allow the user to select chapters for inclusion in a custom book. Clicking on "view chapter" link 310 can load the selected chapter in a publication viewer, discussed below. Clicking the "add chapter to custom book" link 315 initiates a process for adding a selected chapter (or other unit of content) to a custom book.

Figure 12:
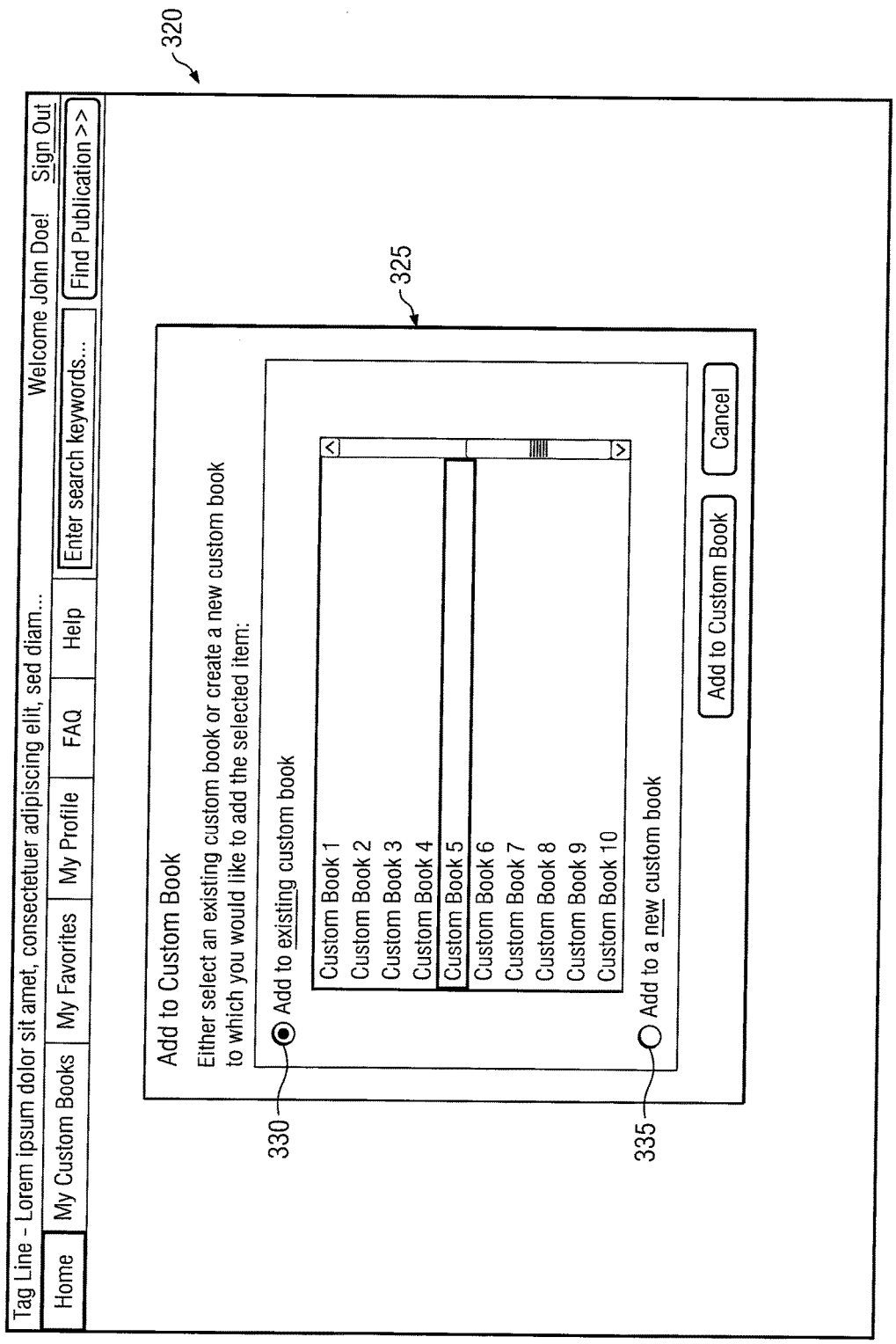
FIG. 12 is a diagrammatic representation of one embodiment of a screen shot for a GUI presented, for example, in response to clicking "add chapter to custom book" link.

FIG. 12 is a diagrammatic representation of a screen shot of one embodiment of a GUI 320 presented, for example, in response to clicking "add chapter to custom book" link 315. GUI 320 provides a region 325 with controls to allow a user to add a chapter to an existing custom book 330 that the user has rights to edit or to create a new custom book 335. According to one embodiment, the user is only permitted to add chapters to unpublished custom books.

Figure 13:
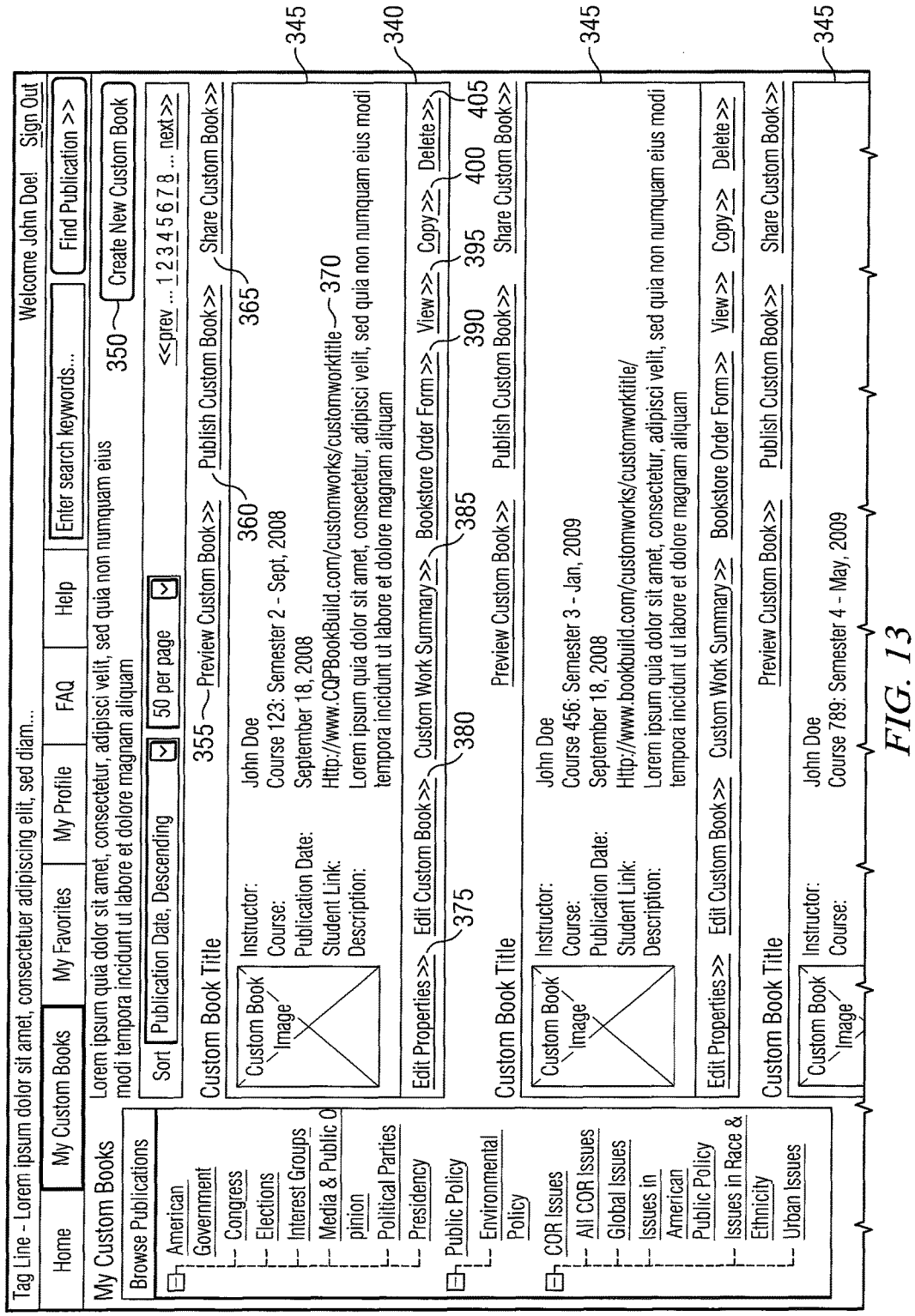
FIG. 13 is a diagrammatic representation of one embodiment of a screenshot for a GUI for viewing custom books available to a user.

FIG. 13 is a diagrammatic representation of a screen shot of one embodiment of a GUI 340 for viewing custom books available to a user. GUI 340 can include summaries 345 of each custom book available to the user. Clicking the "Create New Custom Book" button 350 navigates to the Custom Book Properties screen where the properties for a new custom book can be specified. Once saved, a new custom book 170 is created and added to the Custom Books list and the user can add content to it. Clicking the "Preview Custom Book" link 355 launches a preview custom book screen where the actual, end-result custom book will be generated and displayed so the user can see what the custom book will look like when published. The custom book previewer will include front matter, copyright notices, table of contents and back matter. If a custom book has been published, the "Preview Custom Book" link 355 may be disabled. Clicking the "Publish Custom Book" link 360 launches publish custom book screen where the user can publish custom book 170 in online subscription or print format. If a custom book has been published, the "Publish Custom Book" link 360 may be disabled.

Once published, a user can click the "Share Custom Book" link 365 to navigate to a share custom book page and share custom book 170 with other users via an e-mail notification or other notification. If a custom book has not yet been published, the "Share Custom Book" link 365 may be disabled. According to one embodiment, the "Share Custom Book" 365 link is only available for custom books 170 that were published in online subscription format (i.e., not for print books).

Once published, a custom book is associated with a hyperlink 370 that can be circulated by the creator (via syllabus, e-mail, etc.) to any student that he/she wishes to have access to the work. According to one embodiment, the link is only available for online published books.

Clicking the "Edit Properties" button 375 navigates to a custom book properties page where updates can be made. If a custom book has been published, the "Edit Properties" 375 link may be disabled. Clicking the "Edit Custom Book" link 380 launches a custom book editor screen where content updates can be made to the work. According to one embodiment, once a custom book has been published, its content cannot be edited. Clicking the "Custom Book Summary" link 385 provides the user with a summary of publication information for the custom book.

If a custom book was published in print, clicking the "Bookstore Order Form" link 390 takes the user to a book store order form page associated with the selected title, allowing the user to view and print an order form to order copies of the book from a printer. If the custom book was published online, the "Bookstore Order Form" link 390 may be disabled.

The "View" link 395 launches a custom book viewer where a user can review the content for a custom book. The "View" link 395, according to one embodiment, is only available after a custom book has been published. When the "Copy" link 400 is clicked, a copy of the custom book is created (i.e., content) and the custom book properties screen is displayed so that any related updates can be made. Once saved, the newly created custom book copy is available in the custom books list. The "Copy" feature provides an efficient way to create a new and updated edition for an existing custom book.

Clicking the "Delete" link 405 prompts the user for confirmation and then removes custom book 170 from their custom books list. Users can delete custom books 170 once they have been published. According to one embodiment, custom book 170 is removed from the user's custom books list only, but the actual book remains in library 150.

Figure 14:
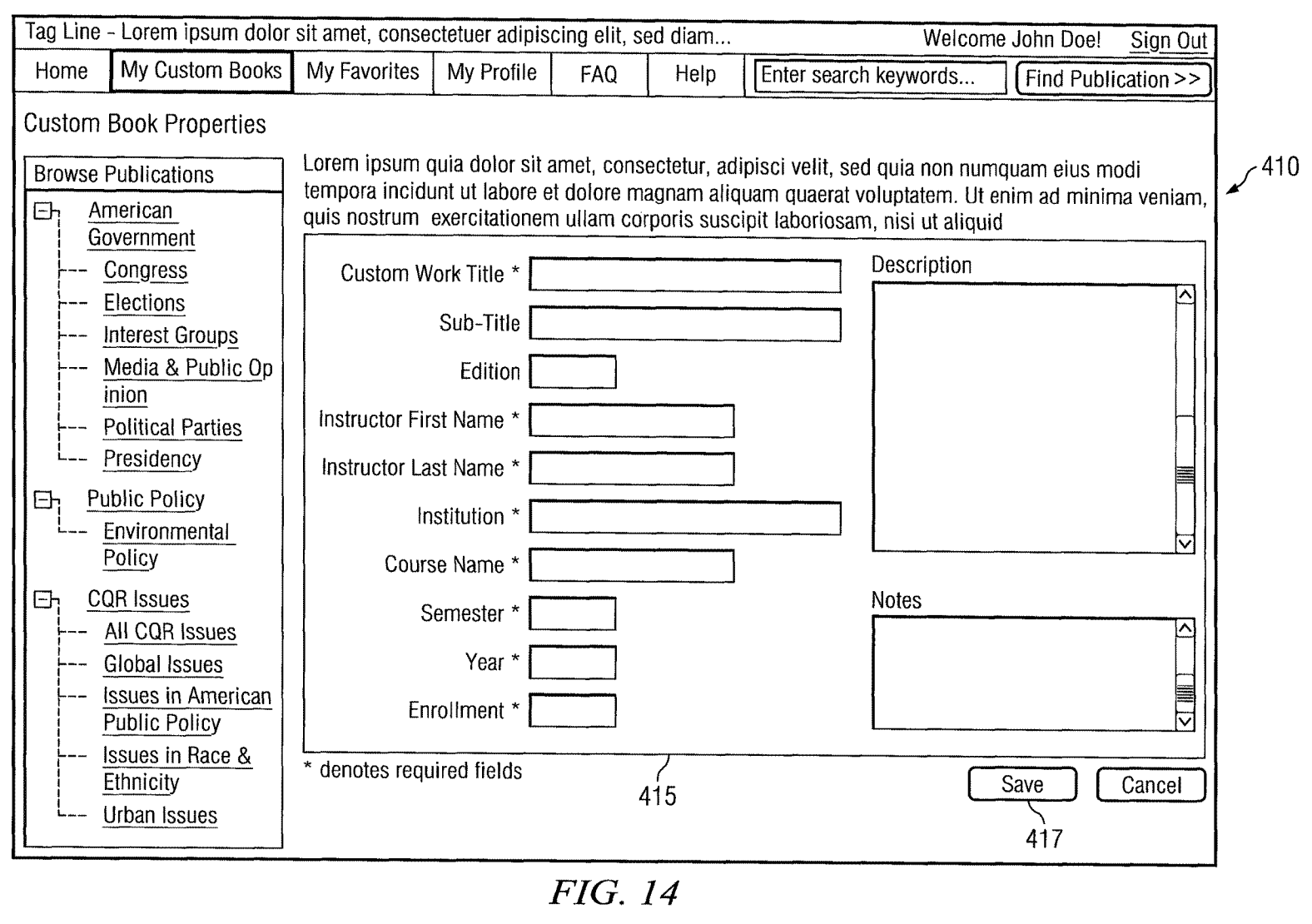

FIG. 14 is a diagrammatic representation of a screen shot of one embodiment of a GUI 410 for editing custom book properties. GUI 410, according to one embodiment, can be displayed in response to a user clicking "Create New Custom Book" button 350. GUI 410 can include a region 415 for which the user can enter metadata for the new custom book. The information entered can be saved when the user clicks on save button 417.

FIG. 15 is a diagrammatic representation of a screen shot of one embodiment of a GUI 420 for sharing a custom book. GUI 410, according to one embodiment, can be displayed in response to a user clicking "Share Custom Book" link 365. GUI 420 can include controls for selecting the type of users with which the custom book will be shared. For example, radio buttons 425 allow the user to share the custom book with students or instructors. Area 430 allows the user to specify email addresses for users with whom the custom book will be shared. Message area 435 allows the user to add a message. Notification area 440 displays system generated content for a notification email. Clicking on the "Share Book" button will cause a notification to be sent to the recipients listed in area 430.

According to one embodiment, the notification email is a system generated email that contains custom book summary information, the Instructor Message (if any), a link to the custom book and a link to the new account registration page.

The <<URL>> tag will be replaced with a link to the custom book. According to one embodiment, the actions of the book build component 140 in response to a user clicking a link can vary depending on the type of user clicking the link. Continuing with the instructor/student paradigm and assuming an instructor is the recipient of the email, book build component 140 can, copy the custom book from the source author's account and push it to the receiving user's account (it will show up in the recipient's "My Custom Books" page as an unpublished custom book) and directs the recipient to the recipient's "My Custom Books" page. Book build component 140 keeps all metadata from the source custom book and allows the recipient to perform all actions normally associated with an unpublished custom book (e.g., view, edit, publish, etc.). According to one embodiment, however, book build component 140 can prevent the recipient from editing personal content created by the original author of the custom book.

If the recipient is a student, book build component 140 can direct the recipient to a student landing page with a summary of the custom book and begin the subscription purchase process. Once the student has purchased the book, the book can show up in the student's "my books" area can be treated identically to any other book purchased by the student.

Figure 16:
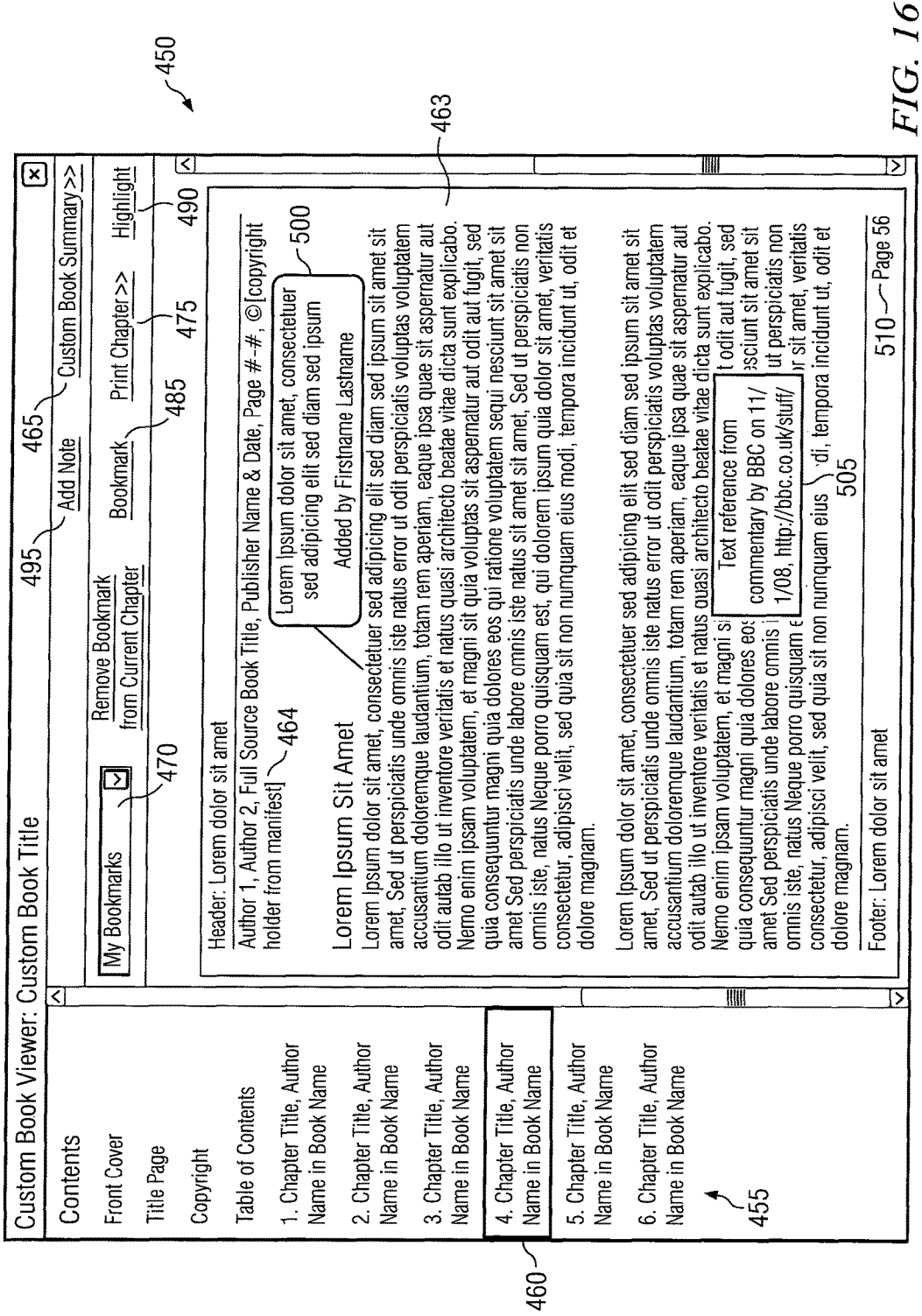
FIG. 16 is a diagrammatic representation of one embodiment of a screenshot for a GUI for viewing an unpublished custom book.

FIG. 16 is a diagrammatic representation of a screen shot of one embodiment a GUI 450 for viewing an unpublished custom book. GUI 450 can include a navigation area 455 to allow a user to select a unit of content (e.g., chapter) in a custom book. Selecting a chapter (e.g., as indicated at 460) causes a content viewing pane 463 to be loaded with relevant content. Additionally, information such as the title of the source book, author and/or other metadata for the chapter can be displayed (indicated at 464). According to one embodiment, the original chapter source information is automatically cited at the top of each chapter, below the header, in standard format, lending to a consistent look and feel.

Clicking the "Custom Book Summary" 465 link will display a custom book summary screen which displays a publication summary (i.e., number of chapters, cost to publish, cost to buyers, etc.) prior to a publication request. Clicking the "Print" button 475 will provide several options for printing the currently selected chapter. The user may be given the option to print a chapter with or without notes (private and/or public notes).

When a user selects a bookmark from the "Bookmarks" dropdown 470, the specified bookmark content is loaded within the viewing pane 463 and the appropriate chapter item is selected within the navigation pane 455. Users can bookmark pages within publications by clicking the "Bookmark" link (button) 485. The book mark is labeled using the chapter and page of the publication and added to the "Bookmarks" dropdown list 470.

The user can add various pieces of UGC to the custom book. For example, a user can highlight text within a publication by selecting text within the viewer pane 463 and then clicking the "highlight" link (button) 490. To remove a highlight, users can select the text that has already been highlighted and click the same "highlight" link (button). Highlights may print in color to allow easier viewing. The highlighting may be displayed to the user who entered the highlighting or to all viewers of the chapter. Additionally, users can add a note to selected text for additional commenting or clarification. Clicking the "Add Note" link (button) 495 results in a pop-up screen where users can specify the text they want to appear in the note. A note can be either Public (all users subscribed to the same custom book will be able to view and print the note) or Private (only the user who created the note will be able to view and print it). Notes can be displayed in a variety of manners, including at the margins. According to one embodiment notes can be displayed as an overlay 500. Notes, in one embodiment, will only be shown if they were either created by the user viewing the custom book, or marked as a public note at the time of creation. A note can be displayed with the name of the person who created the note.

Items such as footnotes from the source material can be displayed in a convenient manner. For example, when a user hovers over a superscripted footnotes link, the corresponding footnote is displayed (e.g., as an overlay 505).

FIG. 17 is a diagrammatic representation of a screen shot of one embodiment of a GUI for printing a chapter, the GUI displayed, for example, in response to a user clicking the "Print" button 475. According to one embodiment, a popup 520 can provide controls for printing a custom book. Popup 520, for example, provides controls 535 for printing a chapter with notes and control 540 for printing a chapter without notes.

Figure 18:
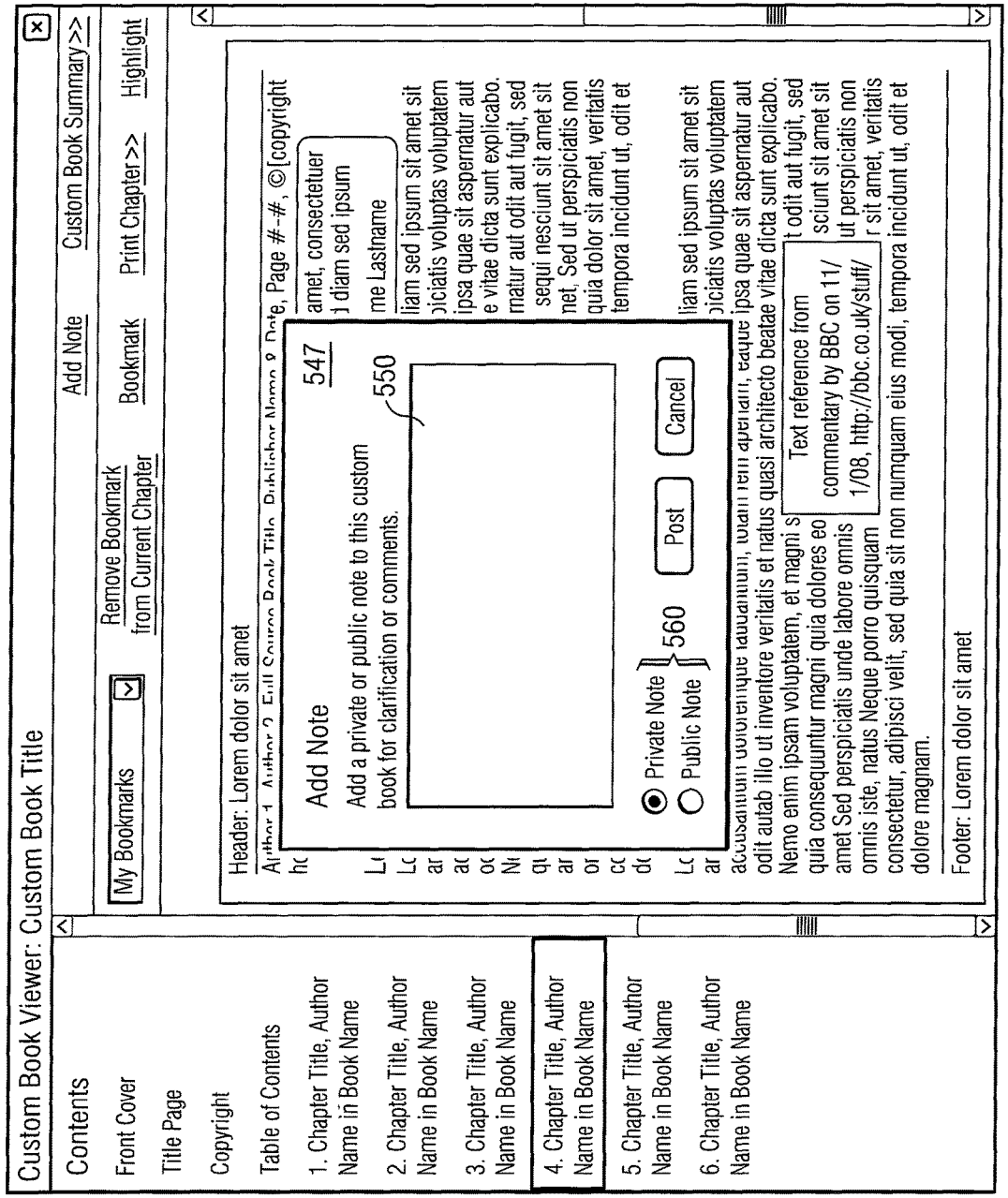
FIG. 18 is a diagrammatic representation of one embodiment of a screenshot for a GUI for adding notes to a chapter, the GUI displayed, for example, in response to a user clicking the "Add Note" button.

FIG. 18 is a diagrammatic representation of a screen shot of one embodiment of a GUI for adding notes to a chapter, the GUI displayed, for example, in response to a user clicking the "Add Note" button 495. According to one embodiment, popup 547 can be provide a text box 550 for adding a note and controls 560 for selecting whether the note will be a public note or a private note.

Figure 19:
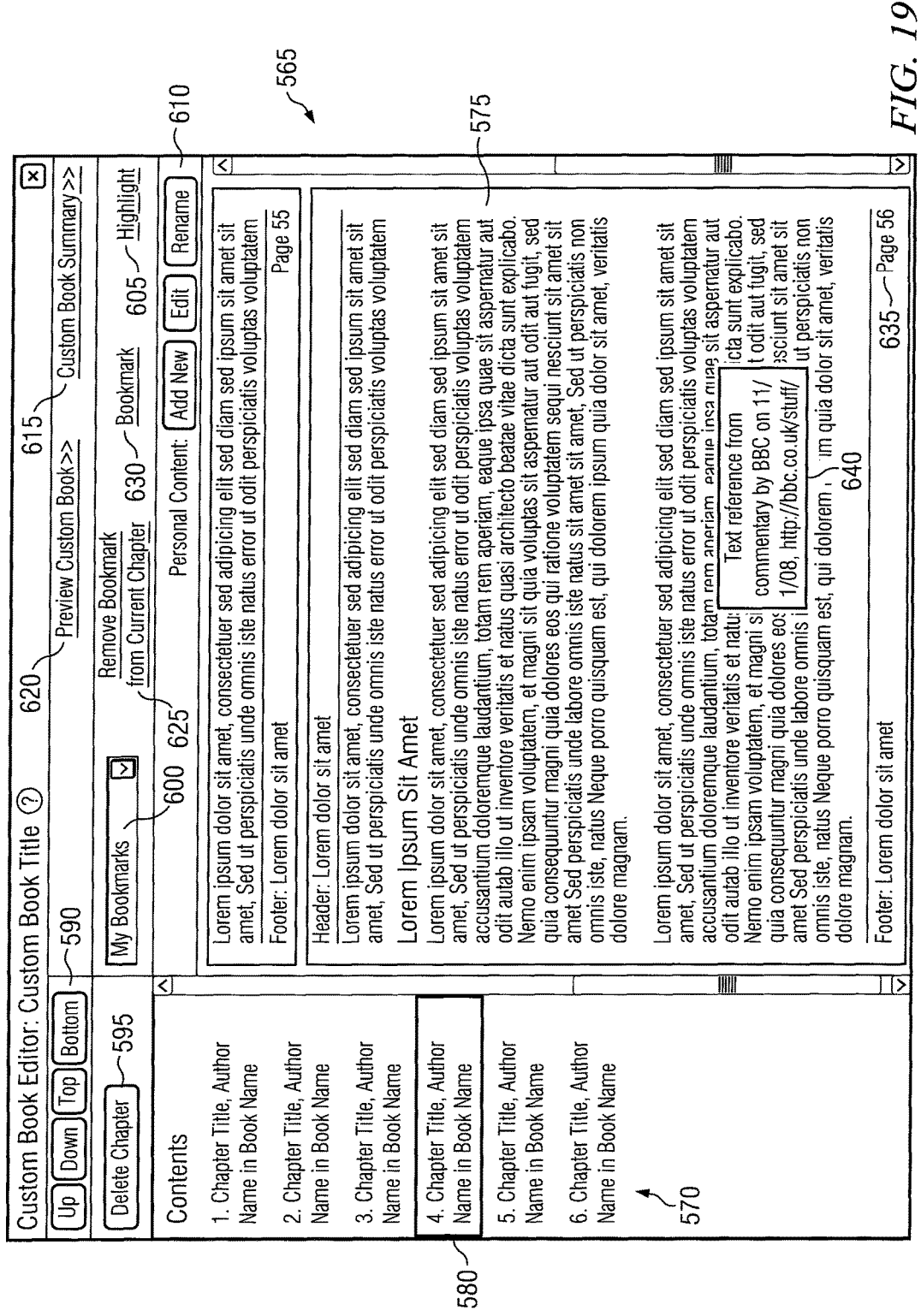
FIG. 19 is a diagrammatic representation of a screen shot for one embodiment of a GUI for editing a custom book.

FIG. 19 is a diagrammatic representation of a screen shot of one embodiment of a GUI 565 for editing a custom book. GUI 565 can include a navigation area 570 and a content viewing area 575. Selecting a custom book chapter (represented by 580) within the navigation pane 570 will cause related content to be loaded into the content viewing pane 575. As discussed above, certain material may not be user editable. For example, as discussed above in conjunction with Table 1, certain material such as the Table of Contents may not be user editable and therefore will not appear in navigation pane 570.

According to one embodiment, the user can rearrange the order of chapters in the custom book using, for example, up/down controls 590 and can remove selected chapters from the custom book by clicking the "Delete" button 595.

When a user selects a bookmark from the "Bookmarks" dropdown 600, the specified bookmark content is loaded within the viewing pane 575 and the appropriate chapter item is selected within the navigation pane 570.

A user can highlight text within a publication by selecting text within the viewer pane and then clicking the "highlight" link (button) 605. To remove a highlight, users can select the text that has already been highlighted and click the same "highlight" link (button) 605.

Figure 20:
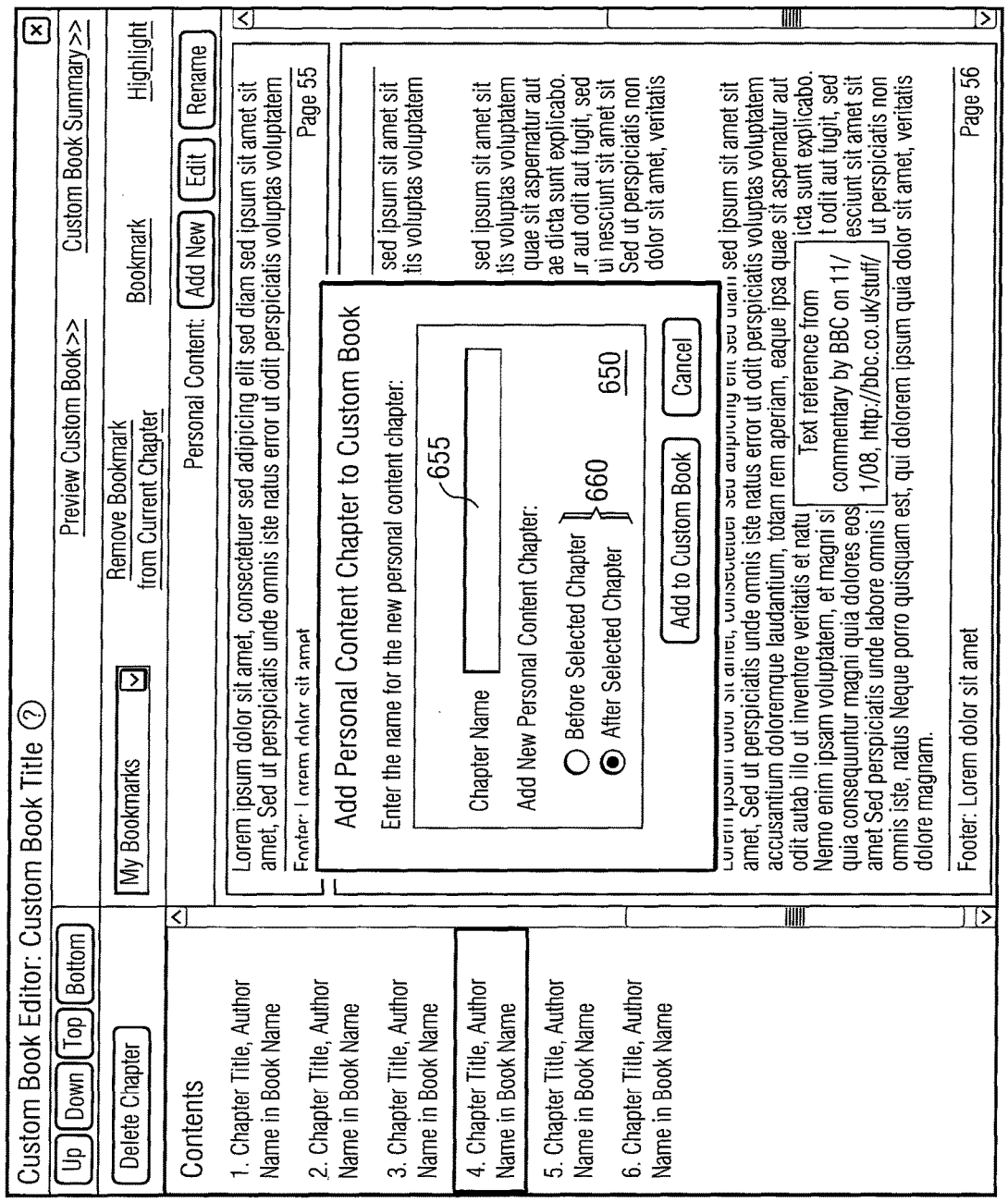
FIG. 20 is a diagrammatic representation of a screen shot of one embodiment of a GUI for adding custom content to a custom book.

Personal content controls 610 allow a user to add, edit or rename personal content. According to one embodiment, the "Add New" button initiates a process to add a personal content chapter to the custom book. A popup can be displayed, as shown in FIG. 20, where the user can name the new personal content chapter as well as select the location (e.g., before or after currently selected chapter) to which the personal content chapter will be added.

Clicking the "Edit" button can activate a personal content editor for the selected custom content chapter. According to one embodiment, this option is not available (e.g., the edit button is disabled) for chapters that were not created by the user. For example, the Edit button may be disabled when the personal content editor is in use. As another example, users may be prevented from editing content from the source material (i.e., publication chapters).

Clicking the "Rename" button can initiate a process to rename the selected personal chapter of the custom book. When the user clicks the "Rename" button, a popup can be displayed with a simple text field where the user can enter the new chapter title. According to one embodiment, this action is not available (e.g., the button is disabled) for chapters that were not created by the user.

The "Custom Book Summary" link 615 can cause the display of a custom book summary screen which, according to one embodiment, displays a publication summary (i.e., number of chapters, cost to publish, cost to buyers, etc.) prior to a publication request. As an additional feature, by clicking the "Preview Custom Book" link 620, instructors can see an accurate representation of what their final custom book will look like when published for print or online use.

Users can bookmark pages within publications by clicking the "Bookmark" link (button) 630. The book mark is labeled using the chapter and page of the publication and added to the "Bookmarks" dropdown list 600. According to one embodiment, users may only create one bookmark per chapter. If a bookmark has been created for the current chapter, clicking the "Remove Bookmark from Current Chapter" link 625 will remove it from the "Bookmarks" dropdown list 600.

In displaying content in content viewing area 575, the GUI can display a variety of material from a source publication. By way of example, but not limitation the original page numbers are displayed within the custom work (shown at 635). Furthermore, information such as the contents of footnotes can be displayed in a convenient manner. According to one embodiment, when a user hovers over a superscripted footnote link, the corresponding footnote is displayed (represented at 640).

FIG. 20 is a diagrammatic representation of a screen shot of one embodiment of a GUI for providing custom content displayed, for example, in response to clicking the "Add New" personal content control. According to one embodiment, the GUI can include a popup 650 on GUI 565 having fields to allow a user to enter metadata about the user provided content (e.g., field 655 for entering a chapter name) and controls 660 for selecting the location of the custom content.

Figure 21:
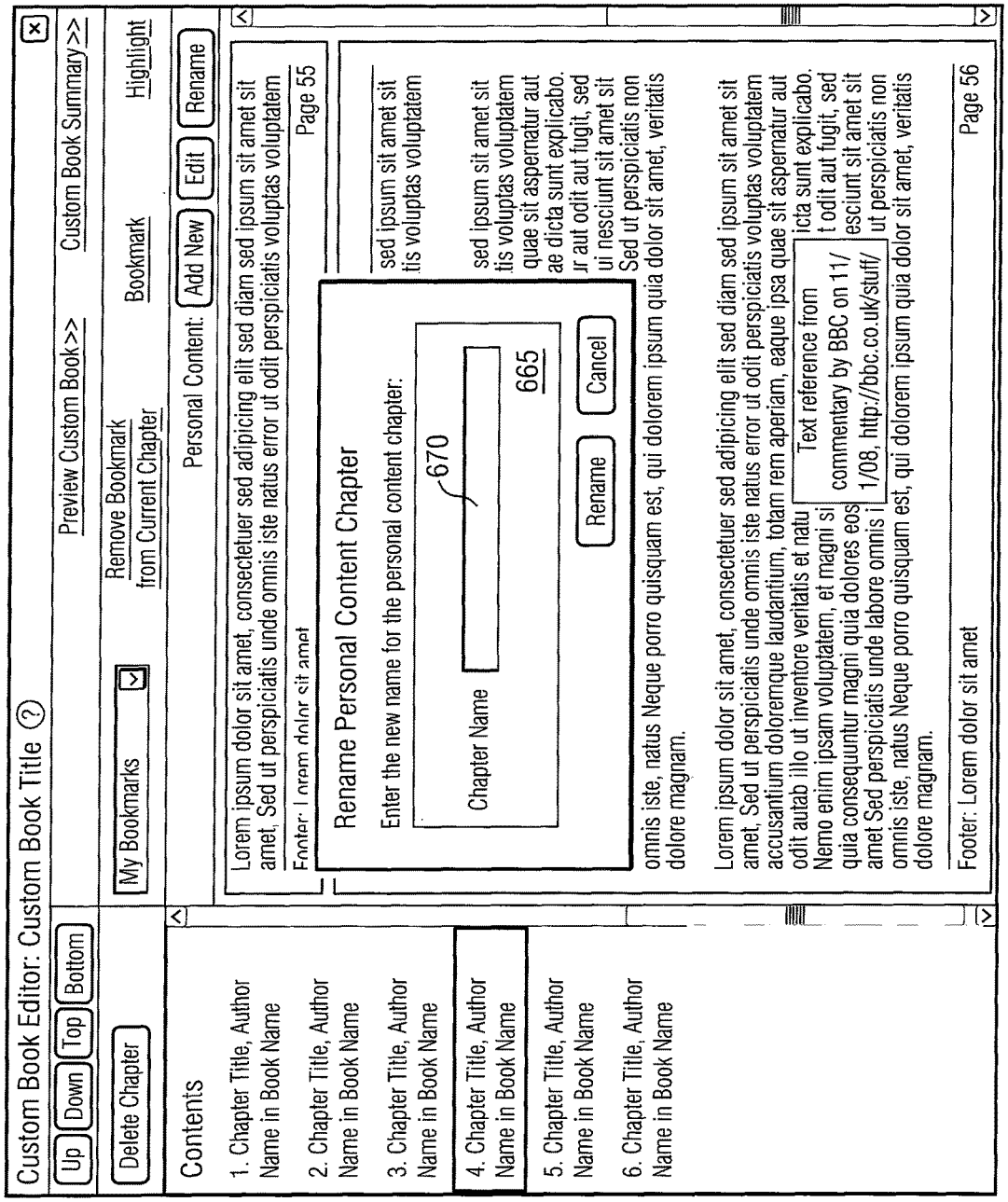
FIG. 21 is a diagrammatic representation of a screen shot of one embodiment of a GUI, for example, in response to clicking the "Rename" button.

FIG. 21 is a diagrammatic representation of a screen shot of one embodiment of a GUI for renaming existing custom content displayed, for example, in response to clicking the "Rename" personal content control. According to one embodiment, the GUI can include a popup 665 on GUI 565 having fields to allow a user to enter metadata about the user provided content (e.g., field 670 for entering a chapter name).

Figure 22:
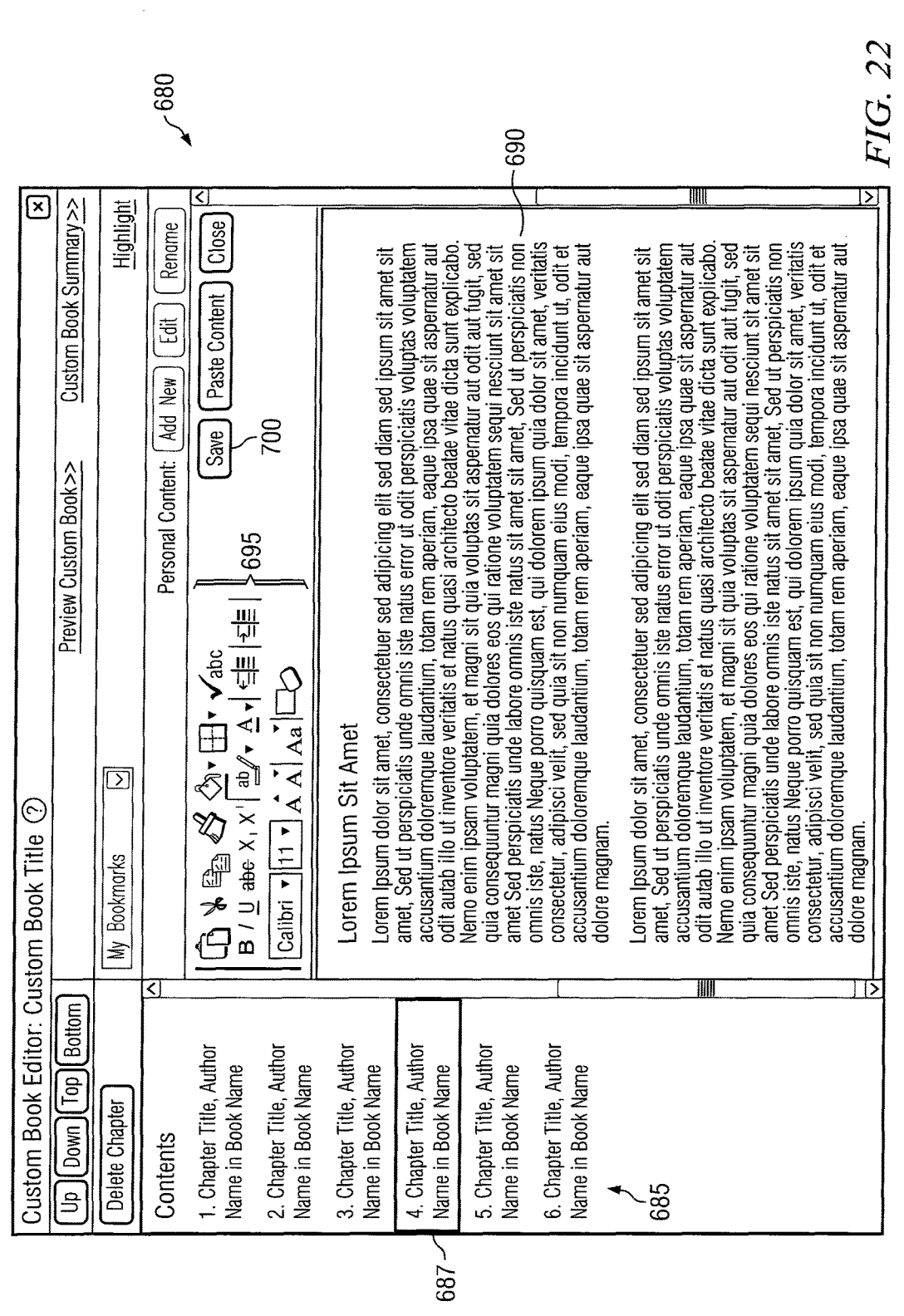

FIG. 22 is a diagrammatic representation of a screen shot of one embodiment of a GUI 680 for a personal content editor. GUI 680 can include a navigation area 685 and a content editing area 690 that provides an embedded editor. Selecting a custom book chapter (represented by 687) within the navigation pane 685 will cause related content to be loaded into the content editing pane 690. Content editing area allows the user to enter text. GUI 680 can provide text editing tools 695 for editing text in area 690 and providing formatting. In some cases, the amount, structure and formatting of text in content editing area 690 may be limited, making it easier for the book build component 140 to convert the custom text into the base book or other format. As discussed above, certain material may not be user editable. For example, as discussed above in conjunction with Table 1, certain material such as the Table of Contents may not be user editable and therefore will not appear in navigation pane 570.

Clicking the "Save" button 700 saves any updates to personal content made within the personal content editor. Clicking the "Close" button 701 de-activates the personal content editor (e.g., reloads content into the content viewing area 575 of FIG. 19). If a user copies content from external content sources (e.g., a Microsoft Word document), clicking "Paste Content" button 703 can cause the insertion of the content within the personal content editor. When content from an external source such as a Microsoft Word document is pasted into the personal content area, the text can be formatted automatically to avoid typical compatibility issues.

Figure 23:
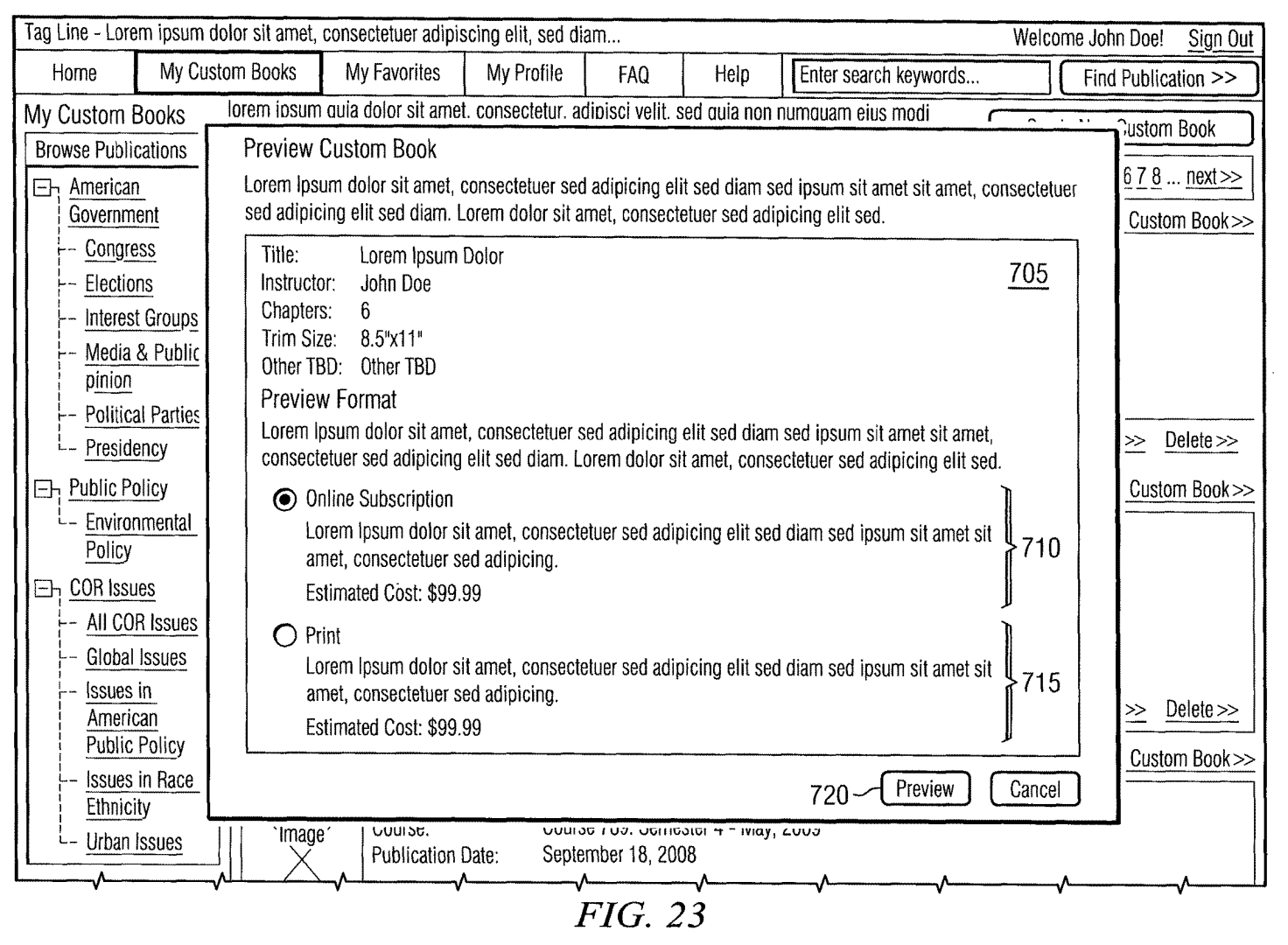

In order to review an accurate visual of what an actual published custom book will look like, users can generate and preview the custom book. FIG. 23 is a diagrammatic representation of a screen shot of one embodiment of a GUI for a generating a preview of a custom book. The GUI can include a popup 705 provided, for example, in response to a user clicking "preview custom book" link 355. The summary provided in popup 705 can display a publication summary (e.g., number of chapters, cost to publish, cost to buyers, etc.) that can be used to make informed decisions prior to a publication request.

According to one embodiment, controls 710 and 715 can be provided to allow an instructor to request whether to preview the custom book in a print format or an electronic publication format. Clicking the "Preview" button 720 can trigger the preview generation process. If "Print" is selected (control 715), the book build component 140 can generate a watermarked, non-printable PDF in the exact format the final printed book will appear, and display it to the user. If "Online Subscription" is selected (control 710), BookBuild can generate the XHTML that would be provided display it within the custom book viewer according to the appropriate CSS style sheets. In either case, the displayed custom book can appear exactly the same as it will when published.

FIG. 24 is a diagrammatic representation of a screen shot of one embodiment of a GUI 725 for previewing a custom book. GUI 725 includes a navigation area 730 and a content viewing area 745. Selecting a custom book chapter within the navigation pane 730 will cause the appropriate section of the custom book to be displayed within the content viewing pane 745. It can be noted that previewing the custom book can include previewing system generated content such as a front cover sheet, table of contents, title pages etc. (represented at 735). Furthermore, it can be noted that the page number from the original publication can be displayed in the content displayed in content viewing pane 745.

Once a user has created a custom book, they can initiate the publication of that work via a publish custom book screen. FIG. 25 is a diagrammatic representation of a screen shot of one embodiment of a GUI 750 for initiating publication of a custom book. The GUI can include controls for selecting a publication format (e.g., controls 755 and 760 for selecting whether to publish the custom book as a print book and/or an on-line/electronic book). For the convenience of the user, GUI 750 can display the price of the custom book for each publication format based on prices calculated on a per chapter basis or according to another scheme (indicated at 765 and 770).

In some cases, administrators (or other classes of users) may also take actions on a custom book. FIGS. 26-27 provide embodiments of GUIs for taking administrative actions on custom books. FIG. 26 is a diagrammatic representation of one embodiment of a GUI 785 for viewing details on a set of custom books 790. GUI 785 presents a variety of metadata including type of book (795), author (800), author status (805), publication date (810), publication approval/rejection status (815) and whether there are notes for a printed publication (820). GUI 785 can also provide a link 830 to more details regarding a book. According to one embodiment, hovering over the notes link can provide an overlay with the contents of the note. For example, note 825 indicates that Book 4 was rejected because it was not long enough (based on human or programmatic moderation).

FIG. 27 is a diagrammatic representation of a screen shot of one embodiment of a GUI 835 illustrating details of a custom book and providing administrator option. According to one embodiment, GUI 835 can be displayed in response to clicking a details link 830. GUI provides a summary area 840 providing various pieces of information about a custom book. Clicking "Approve" button 845 for a custom book in the state "Pending Approval" or "Rejected" allows the Administrator to finalize the publication process, changes the book's status to "Enabled" and sends a notification to users that the book has been published. In the case of a book published for print, a bookstore order form can be also generated and made available to the creator of the custom book so that the user can order the book from a printer. The administrator may be allowed to add notes prior to approving the custom book.

Clicking the "Reject" link 850 for any custom book in the state "Pending Approval" changes the custom book's status to "Rejected" and sends an e-mail to the creator notifying him or her of the rejection. Users other than the creator and users having sufficient privileges (e.g., co-creators, administrators or other users) cannot view a book that has been rejected. Administrators may be given other options, such as editing the custom book, editing the custom book properties or taking other actions.

Figure 28:
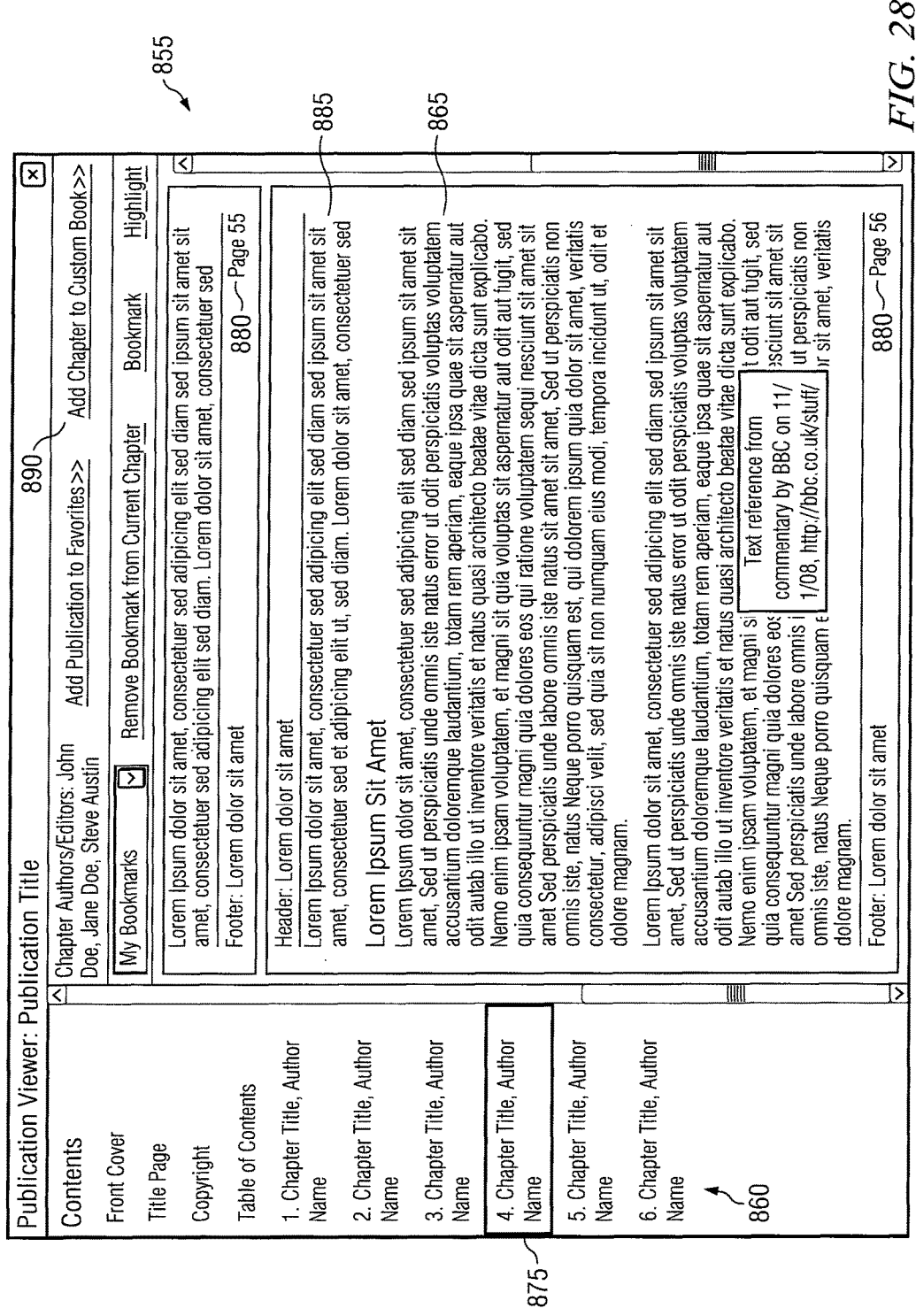
FIG. 28 is a diagrammatic representation of a screen shot of one embodiment of a GUI for a publication viewer.

When a custom book has been accepted for publication on-line, the custom book may be viewed through a publication viewer. The publication viewer, according to one embodiment, can be provided through a browser based program. For example, if the custom book appears as a publication in GUI 340 of FIG. 13, and the user clicks view publication link 265, the user can be presented with the custom book in the publication viewer. FIG. 28 is a diagrammatic representation of one embodiment of a GUI 855 for a publication viewer. GUI 855 can include a content navigation area 860 and a content viewing area 865. Content navigation area 860 can present the units of content viewable in content viewing area 865. Selecting a unit of content (e.g., a chapter), as indicated at 875 causes the unit of content to be displayed in content viewing area 865.

The published custom book appears as a continuous publication with consistent formatting, while preserving structural information from the source materials (e.g., source page numbers 880). According to one embodiment, the various chapters in the published custom book can have various structural elements, such as titles, subheading, footnote, header, can appear with consistent formatting (e.g., font, size, placement) even if the structural elements had inconsistent formatting in the source materials. Additionally, bibliographic information for each chapter can appear in the published custom book in a common format at, for example, area 885.

If the user has permission to create custom books, the user may be given the option to add the selected chapter to a new custom book (e.g., by clicking link 890). The user can be given similar options to add UGC such as notes and content to the published custom book, add bookmarks, viewing footnotes, etc.

The example GUIs provided in FIGS. 9-28 are provided by way of example only. Information and controls for creating, editing, publishing, approving, viewing or undertaking other actions with respect to publications and custom books can be provided in any suitable format. Furthermore, while, in the examples given above, the user is given the option of publishing the custom book for print or online, the user may be given other options, such as publishing the custom book in a format consumable by a specific e-reader or program.

Figure 29:
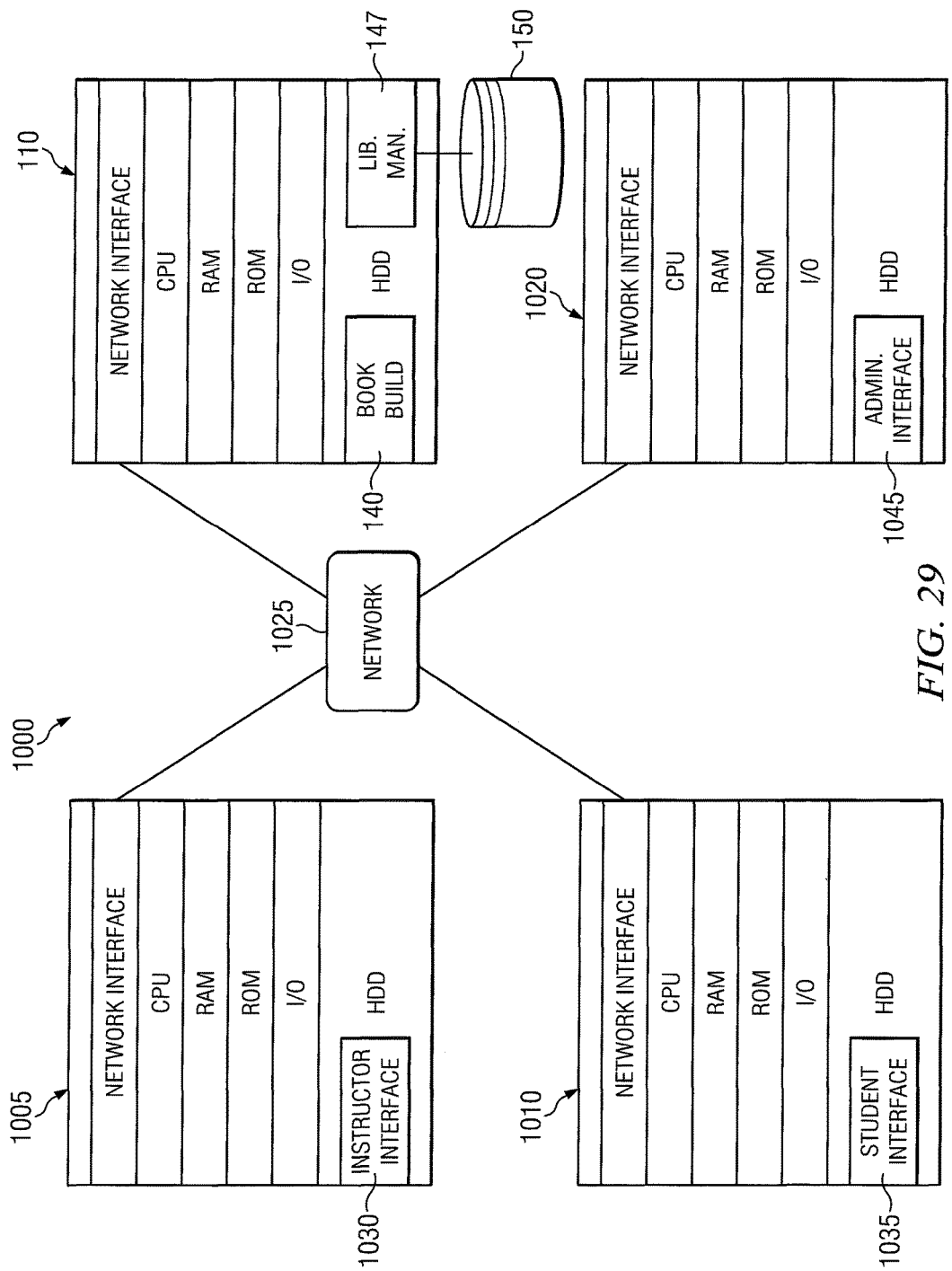
FIG. 29 is a diagrammatic representation of one embodiment of a system for building an electronic publication.

FIG. 29 is a diagrammatic representation of one embodiment of a system for building an electronic publication. System 1000 comprises an instructor computer 1005, a student computer 1010, a book building system 110 and an administrative computer 1020 connected by a network 1025. Each computer can comprise a CPU, RAM/ROM, I/O interfaces, network interfaces, hard disk drives, optical drives and other computer components. Instructor computer 1005 can run an instructor interface component 1030 stored on a non-transitory computer readable medium (RAM, HDD, optical disk, flash memory, primary memory or other non-transitory computer readable medium), student computer 1010 can run a student interface component 1035 stored on a non transitory computer readable medium, book building system 110 can provide a book build component 140 stored on a non-transitory computer readable medium and administrative computer 1020 can store an administrative component 1045 stored on a non-transitory computer readable medium. Book building component 140 can be part of or interface with a library management program 147 that manages a library of content 150. Network 125 can be a bi-directional network. Examples of networks include the LANs, WANs, wireless networks, the Internet or other network(s).

Book build component 140 can interact with or be part of a library management program 147 that manages a library 150 of content (e.g., a content management system or other system that manages library 150). Book build component 140 can map requests from browser application program 120 to appropriate API calls for the library management program 147.

Figure 30:
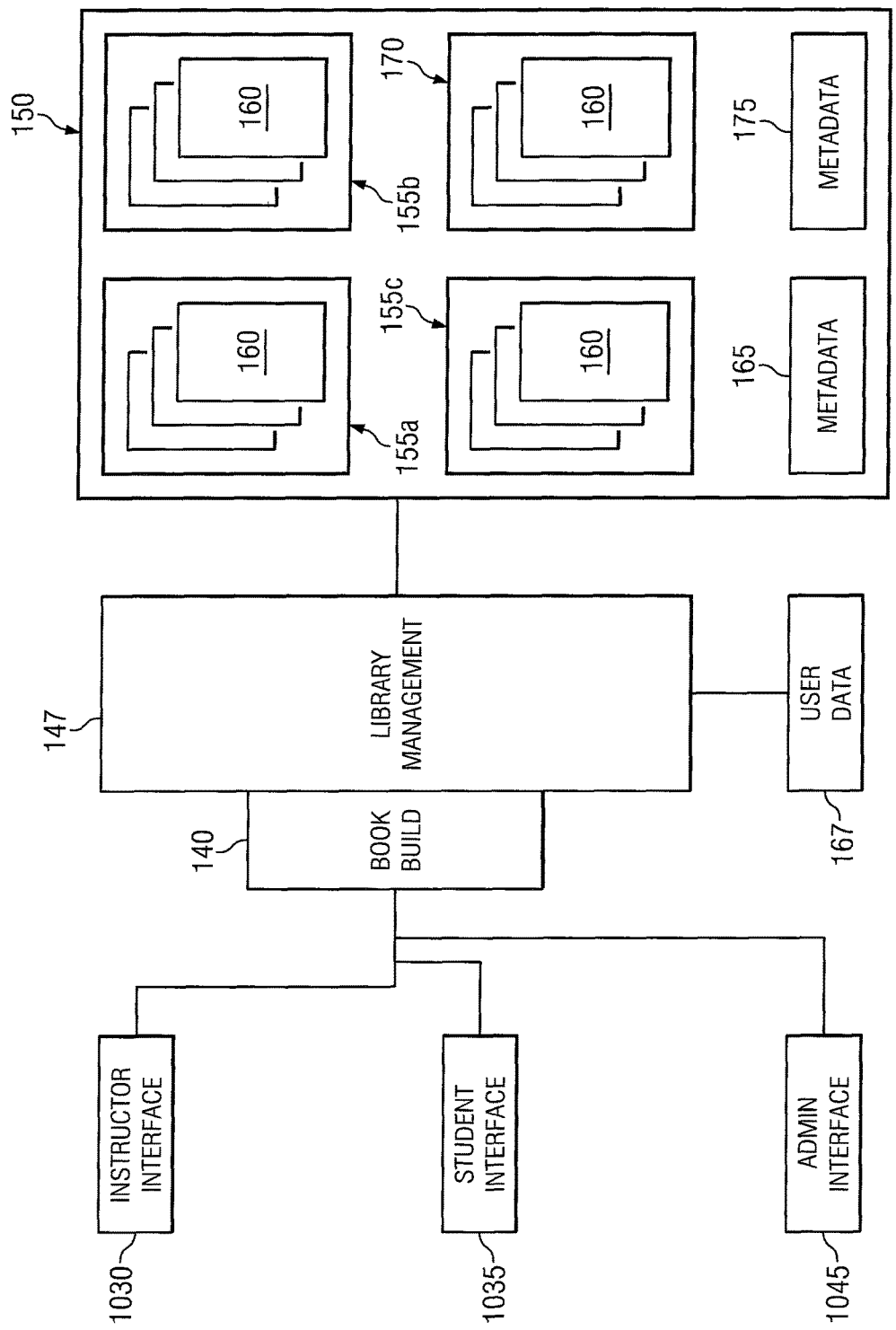
FIG. 30 is a diagrammatic representation of one embodiment of a system for creating custom books.

FIG. 30 is a diagrammatic representation of one embodiment of a system for creating custom books. According to one embodiment, book build component 140 interacts with instructor interface component 1030 to build custom books and with student interface component 1035 to display the custom books. Book build component 140 can provide an interface, such as a SOAP API accessible through HTTP/HTTPs. Instructor interface component 1030 and student interface component 1035 can be flash programs, JAVA programs or other program running in a browser and provided by book building component 140 that are programmed to make requests to book build component 140. In one embodiment, student interface component 1035 can be essentially the same as instructor interface component 1030, but with various instructor features disabled.

Instructor interface component 1030 and student interface component 1035 can present information to a user according to templates. A template can specify how content appears and how other information such as information about a book and navigation information appears. A template may also specify what types of content or other information are editable in instructor interface component 1030 or student interface component 1035.

Book build component 140 can interact with or be part of a library management program 147 that manages a library 150 of content (e.g., a content management system or other system that manages library 150). Book build component 140 can map requests from instructor interface component 1030 and student interface component 1035 to appropriate API calls for the library management program 147.

According to one embodiment, library 150 comprises a number of electronic books 155 (e.g., book, magazine, journal) and associated metadata. Each electronic book 155 can be stored as a set of files 160 defining the units of content for the books. By way of example, each electronic book 155 can be stored as a set of files for each chapter. Additionally, library 150 can store metadata for each book 155 or chapter. Book build component can allow a user having sufficient permissions to select units of content and create a new custom book 170 stored in library 150 or elsewhere. The new custom book can be maintained as a set of files for units of content and metadata 175. Book build component 140 can further publish new custom book 170, by for example, making custom book 170 available to student interface component 1035 online. In making the book available online, book build component 140 can apply style sheets or other mechanisms so that the published book appears as a continuous, consistent book.

Thus, one embodiment of a system for building electronic books can include an application providing various web interfaces which expose existing sources of content to users with the purpose of aggregating and repurposing selected content, into new, customized derivative works. These works may then be distributed to other users in a variety of formats, both physical and digital.

Book build component 140 can provide additional functionality for content providers to carry out administrative and configuration tasks quickly and easily online. According to one embodiment, book build component 140 can provide administrator interface component 1040 for 1) managing all aspects of user accounts, including adding users, approving registration requests, assigning account types, modifying user information, and deleting users; 2) setting pricing and discounts for content types, custom books, subscriptions, and product bundles; 3) creating, defining, and adding new types of content (books, magazines, custom articles, etc.); 4) managing custom books, including viewing, editing, creating, deleting, setting status as Active or Inactive, and sharing custom works with multiple users; 5) running and viewing reports with business intelligence information regarding user activity, sales, chapter usage, and book statistics; and 6) the maintenance and management of ISBNs to derivative works.

In the above examples, the basic content unit is a chapter, whether a single page or multiple pages. However, other embodiments can allow books to be divided up at finer granularity (e.g., page or paragraph) and can divide text from graphics so that an instructor can choose just the text from a chapter, but not the graphics. In some embodiments, administrators can embargo certain content units to prevent those content units from being used in a new book 170. For example, a particular book may be available as a whole and certain chapters may be available for use in custom books, but other chapters (or content units) may not be available for use in custom books. Furthermore, administrators may embargo resources (e.g., images) within a unit of content.

Various embodiments described herein may be implemented in client computers, servers or other computing devices. Each computing device can include a central processing unit connected to a memory and storage via a bus. The central processing unit may represent a single processor, multiple processors, a processor(s) with multiple processing cores and the like. Storage may include a non-transitory storage medium such as hard-disk drives, flash memory devices, optical media and the like.

The foregoing specification described specific embodiments. However, one of ordinary skill in the art appreciates that various modifications and changes can be made without departing from the scope of the disclosure. Accordingly, the specification and figures are to be regarded in an illustrative rather than a restrictive sense, and all such modifications are intended to be included within the scope of the disclosure.

The description herein of illustrated embodiments, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments and examples for are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for building a custom publication comprising:
receiving a selection of units of content for inclusion in a custom publication, each unit of content selected from source publications;
accessing a library of electronic source publications, the library having defined units of content within the same publications and storing source publication metadata for the defined units of content, wherein the custom publication includes references to defined units of content associated with the selected units of content;
creating a set of custom publication units for an unpublished custom publication, wherein creating the set of custom publication units comprises copying the selected units of content and associating the copied, selected units of content with the unpublished custom publication;
including additional content in at least one of the set of custom publication units of content;
publishing the unpublished custom publication, wherein publishing the unpublished custom publication comprises:
for common structural elements in the custom publication units, including the at least one custom publication unit including the additional content,
determining corresponding structural element type, and
applying consistent styling to each of the common structural elements in the set of custom publication units of content, including the at least one custom publication unit including the additional content, based upon the determined structural element type, to create a published custom publication with consistent styling; and providing the published custom publication in an electronic format.

2. The method of claim 1, wherein the published custom publication comprises at least one non-text portion.

3. The method of claim 1, wherein applying consistent styling includes reflowing content into a specified format and size.

4. The method of claim 1, wherein the electronic format is a format that can be consumed by an e-reader, a format that can be consumed by a web browser, or a print format.

5. The method of claim 1, wherein the at least one of the set of custom publication units that includes the additional content includes both the additional content and at least one of the copied, selected units of content.

6. The method of claim 5, wherein the additional content is specified by the user.

7. The method of claim 5, wherein the additional content is a reference to a source of the at least one of the copied, selected units of content.

8. A system for building a custom publication, comprising:

a processor;

a data store, storing a library of electronic source publications having defined units of content within the source publications, the library storing source publication metadata for the defined units of content, wherein the custom publication includes references to defined units of content associated with the selected units of content;

a non-transitory computer readable medium storing a set of instructions executable by the processor for:

receiving a selection of units of content for inclusion in a custom publication, each unit of content selected from one of the source publications;

creating a set of custom publication units for an unpublished custom publication, wherein creating the set of custom publication units comprises accessing the library, copying the selected units of content and associating the copied, selected units of content with the unpublished custom publication;

including additional content in at least one of the set of custom publication units of content;

publishing the unpublished custom publication, wherein publishing the unpublished custom publication comprises:

for common structural elements in the custom publication units, including the at least one custom publication unit including the additional content, determining a corresponding structural element type, and applying consistent styling to each of the common structural elements in the set of custom publication units of content, including the at least one custom publication unit including the additional content, based upon the determined structural element type, to create a published custom publication with consistent styling; and providing the published custom publication in an electronic format.

9. The system of claim 8, wherein the published custom publication comprises at least one non-text portion.

10. The system of claim 8, wherein applying consistent styling includes reflowing content into a specified format and size.

11. The system of claim 8, wherein the electronic format is a format that can be consumed by an e-reader, a format that can be consumed by a web browser, or a print format.

12. The system of claim 8, wherein the at least one of the set of custom publication units that includes the additional content includes both the additional content and at least one of the copied, selected units of content.

13. The system of claim 12, wherein the additional content is specified by the user.

14. The system of claim 12, wherein the additional content is a reference to a source of the at least one of the copied, selected units of content.

15. A non-transitory computer readable storage medium storing instructions for:

receiving a selection of units of content for inclusion in a custom publication, each unit of content selected from source publications;

accessing a library of electronic source publications, the library having defined units of content within the source publications and storing source publication metadata for the defined units of content, wherein the custom publication includes references to defined units of content associated with the selected units of content;

creating a set of custom publication units for an unpublished custom publication, wherein creating the set of custom publication units comprises copying the selected units of content and associating the copied, selected units of content with the unpublished custom publications;

including additional content in at least one of the set of custom publication units of content;

publishing the unpublished custom publication, wherein publishing the unpublished custom publication comprises:

for common structural elements in the custom publication units, including the at least one custom publication unit including the additional content, determining a corresponding structural element type, and applying consistent styling to each of the common structural elements in the set of custom publication units of content, including the at least one custom publication unit including the additional content, based upon the determined structural element type, to create a published custom publication with consistent styling; and providing the published custom publication in an electronic format.

16. The computer readable storage medium of claim 15, wherein the published custom publication comprises at least one non-text portion.

17. The computer readable storage medium of claim 15, wherein applying consistent styling includes reflowing content into a specified format and size.

18. The computer readable storage medium of claim 15, wherein the electronic format is a format that can be consumed by an e-reader, a format that can be consumed by a web browser, or a print format.

19. The computer readable storage medium of claim 15, wherein the at least one of the set of custom publication units that includes the additional content includes both the additional content and at least one of the copied, selected units of content.

20. The computer readable storage medium of claim 19, wherein the additional content is specified by the user.

21. The computer readable storage medium of claim 19, wherein the additional content is a reference to a source of the at least one of the copied, selected units of content.

* * * * *

UNITED STATES PATENT AND TRADEMARK OFFICE
CERTIFICATE OF CORRECTION

PATENT NO. : 9,753,897 B2  
APPLICATION NO. : 14/704604  
DATED : September 5, 2017  
INVENTOR(S) : Robert Boenau et al.

Page 1 of 1

It is certified that error appears in the above-identified patent and that said Letters Patent is hereby corrected as shown below:

In the Claims

Claim 1:
Column 24, Line 44, delete "same" and replace with "source"

Claim 1:
Column 24, Line 63, insert -- a -- between "determining" and "corresponding"

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*